(12) United States Patent
Ulliman et al.

(10) Patent No.: US 12,430,999 B2
(45) Date of Patent: Sep. 30, 2025

(54) WASTEWATER PUMPING SYSTEM ACCESSORY

(71) Applicant: Zoeller Pump Company, LLC, Louisville, KY (US)

(72) Inventors: Andrew Ulliman, Louisville, KY (US); Jason Nett, Floyds Knobs, IN (US); Robert Lee, New Taipei (TW); Paul Weller, Louisville, KY (US)

(73) Assignee: Zoeller Pump Company, LLC, Louisville, KY (US)

( * ) Notice: Subject to any disclaimer, the term of this patent is extended or adjusted under 35 U.S.C. 154(b) by 320 days.

(21) Appl. No.: 18/168,719

(22) Filed: Feb. 14, 2023

(65) Prior Publication Data
US 2023/0274628 A1 Aug. 31, 2023

(51) Int. Cl.
*G08B 21/18* (2006.01)
(52) U.S. Cl.
CPC .................. *G08B 21/182* (2013.01)
(58) Field of Classification Search
CPC ..................................... G08B 21/182
USPC ....................................... 340/618
See application file for complete search history.

(56) References Cited

U.S. PATENT DOCUMENTS

| | | | |
|---|---|---|---|
| 5,038,418 A | 8/1991 | Frey | |
| 5,571,633 A | 11/1996 | Hagiuda | |
| 5,793,294 A * | 8/1998 | Schepka | G01F 23/243 73/304 R |
| 7,203,976 B1 | 4/2007 | Weller et al. | |
| 8,562,287 B2 | 10/2013 | Schmidt et al. | |
| 8,807,156 B2 * | 8/2014 | Lang, III | F16K 24/042 137/202 |
| 10,188,234 B1 * | 1/2019 | Sullivan | A01G 27/008 |
| 10,458,876 B1 * | 10/2019 | Billman | G01M 3/40 |
| 2002/0047783 A1 * | 4/2002 | Bergum | H01H 36/02 340/618 |
| 2006/0181425 A1 * | 8/2006 | Crane | G08B 29/14 342/124 |
| 2007/0103324 A1 * | 5/2007 | Kosuge | G01F 23/296 340/618 |
| 2015/0130621 A1 * | 5/2015 | Seiler | H01R 33/72 340/628 |
| 2016/0284193 A1 * | 9/2016 | Davis | G08B 21/18 |
| 2024/0269390 A1 * | 8/2024 | Gazeley | A61M 5/31563 |

* cited by examiner

Primary Examiner — Kam Wan Ma
(74) Attorney, Agent, or Firm — Scott R. Cox; Jessica C. Ronald; Jeffrey Langer

(57) ABSTRACT

A high water alarm system for a water containing or wastewater treatment system including a main body containing a generally cylindrical outer and inner wall, a bottom portion and an open top portion, a battery container secured within the main body portion, and a high water sensor secured through the main body, which sensor is connected to an alarm located within the system. Another embodiment adds a gas filter and a vent valve seal to the high water alarm system.

20 Claims, 28 Drawing Sheets

WASTEWATER PUMPING SYSTEM ACCESSORY

CROSS-REFERENCES

This application claims priority from provisional application Ser. No. 63/313,952, filed Feb. 25, 2022. All publications, patents and patent applications referred to herein are incorporated by reference in their entirety.

BACKGROUND OF THE INVENTION

The present invention relates to a self-contained high water alarm system for use with various wastewater treatment systems and other water treating or containing systems which activates an alarm when wastewater or water reaches a designated level within the system.

The present invention also relates to a self-contained integrated gas vent valve and high water alarm system for use with various wastewater treatment systems and other water containing or water treating systems which activates an alarm when wastewater or water reaches a designated level within the system and also vents undesirable gases contained in said systems.

This section is intended to introduce various aspects of art that may be related to the present inventions, which are described below. This discussion is believed to be helpful in providing background information to facilitate a better understanding of the various aspects of the present inventions. Accordingly, these statements are to be read in that light but not as admissions of prior art.

Self-contained wastewater treatment or other water containing systems have utility for a number of situations. For example, self-contained wastewater treatment systems may be utilized where commercial septic or sewer systems are not available or easily accessible. One particular utilization is a floor level waste collection and disposal unit used with toilets, showers and other wastewater sources in bathrooms in locations not easily modified for use with below level piping that is commonly present with conventional bathroom facilities. Such units are particularly useful when a bathroom is added to an existing basement or is placed on an existing concrete slab. Self-contained wastewater treatment or water containing systems can also be placed wherever drainage is problematic, whether for commercial or home use. Such systems include those that grind waste or pump water up slope and which have a minimal impact on an existing structure.

Wastewater treatment systems generally include a tank for storing wastewater, a treatment system, a discharge pump, that removes treated wastewater from the tank after treatment, and piping utilized for discharge of the treated wastewater.

Commonly utilized with these wastewater treatment systems are one or more liquid level measuring devices, such as low and high water sensors, which are located within the tank and which detect the level of liquids present within the tank. Conventionally, these sensors turn on a discharge pump when the liquid reaches a predetermined level and then turn off the pump when the level of the liquid drops below a second predetermined level. Additional high water sensors may be utilized within the tank to provide a warning that the level of liquid within the tank has reached an unsafe height. These sensors are generally similar in design and structure to other sensors for measuring the level of liquid within the tank but are generally located at a higher level within the tank.

Because of the nature of the wastewater present within this type of tank, it is common for undesirable gases to be present therein, which gases are discharged from the tank using a conventional system. Conventionally, a vent, pipe, or other system, which vents these gases, is included in the tank within these wastewater treatment systems.

Notwithstanding existing wastewater treatment and water containing systems, it has been surprisingly discovered that a separate device introduced into the tank of the system that includes a high water alarm, which is activated when liquids within the tank reach an unsafe level, is a useful and practical solution to issues common with such wastewater treatment and water containing systems.

Further, it has been surprisingly discovered, where local regulations permit, that a single integrated device that both vents and filters gases that are present within the tank and provides a high water alarm when liquids within the tank reach an unsafe level, is a useful and practical solution to issues common with such wastewater treatment systems.

The objects and features of the present inventions mentioned herein will become apparent to those skilled in the art from a consideration of the following detailed description, drawings, and claims. The disclosed description, along with the accompanied drawings, provides a selected example of construction of the device to illustrate the invention, but does not place a limitation on the scope of the invention. FIG. 1 is a perspective view of a high water alarm system utilized with wastewater or water treatment systems.

DETAILED DESCRIPTION OF A PREFERRED EMBODIMENT OF THE INVENTION

Figure 1:
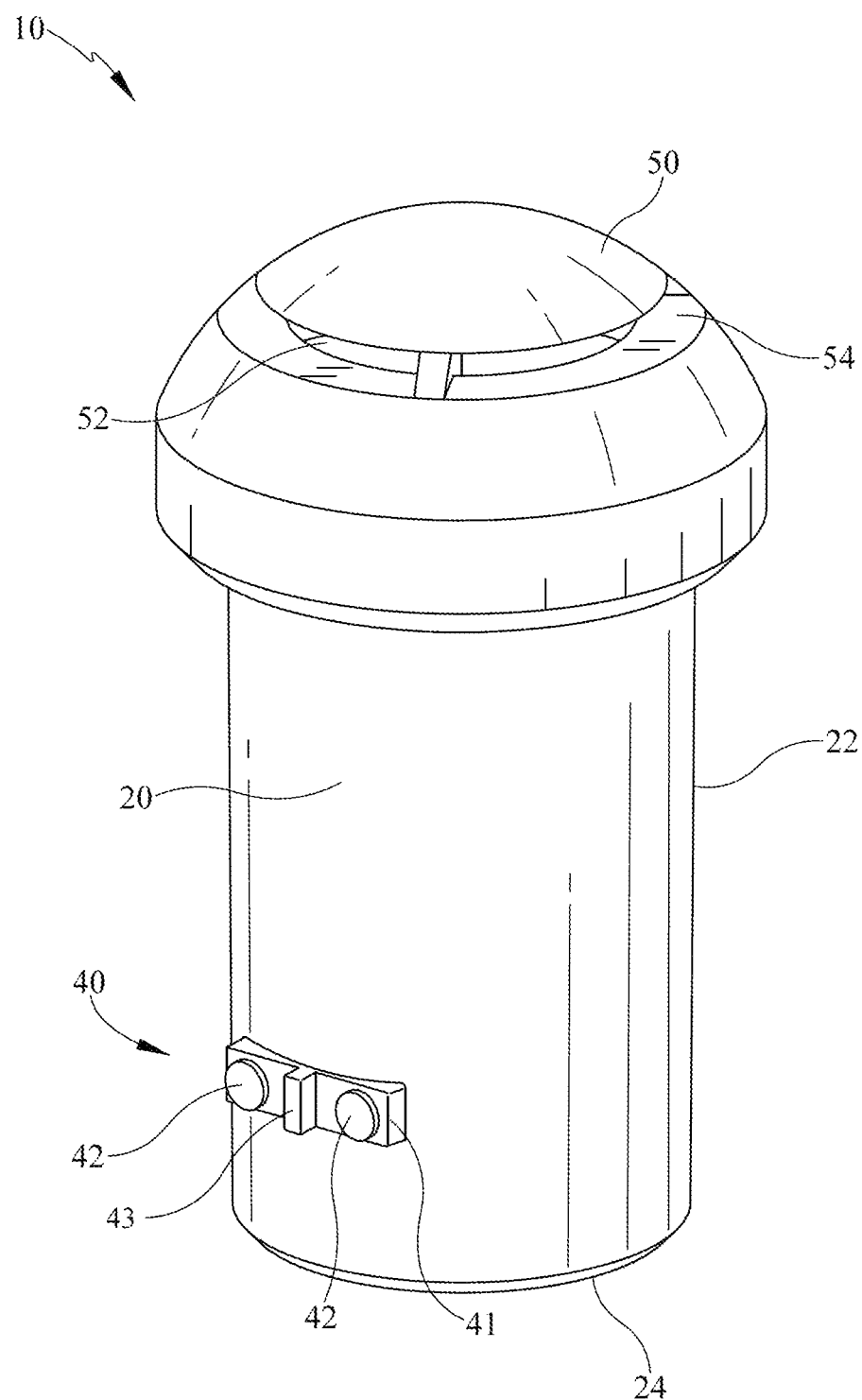
FIG. 1A is a perspective view of an alternative embodiment of the high water alarm system of FIG. 1.

Referring to FIG. 1, there is disclosed a first embodiment of a high water alarm system (10) designed for use with a wastewater treatment system or other water treating or containing systems. In this first embodiment, as shown in FIGS. 1, 3B, 5 and 13, the high water alarm system includes a generally cylindrical main body (20), defined by a generally cylindrical outer wall (22) and inner wall (23). This main body includes a closed bottom (24) and an open top (26). Although a generally cylindrical shape is shown for the main body of the high water alarm system, other shapes may also be used such as, but not limited to, a rectangular cube shape, a square cube shape, and a partially cylindrical shape.

Figure 1A:
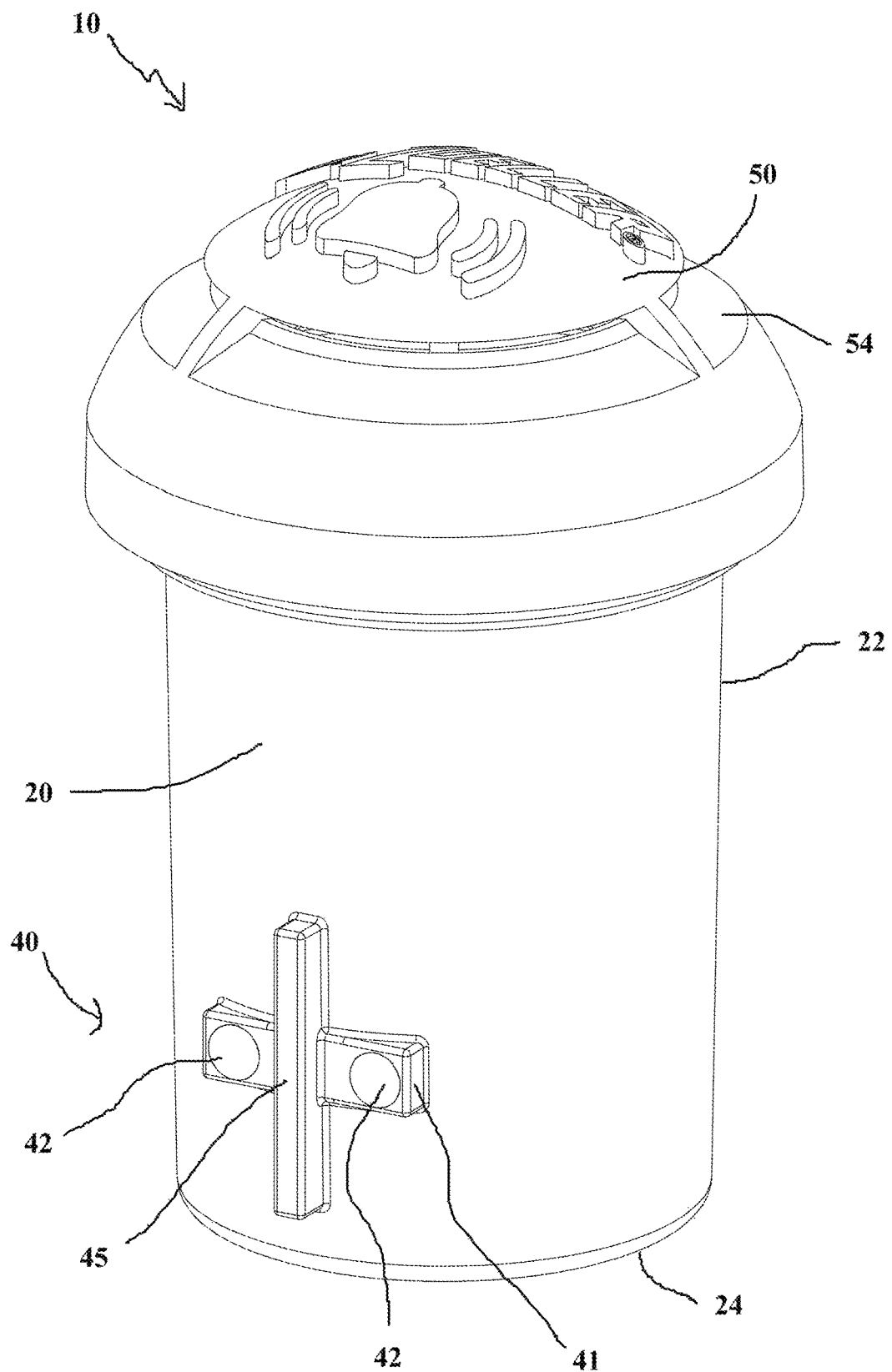
Figure 3A:
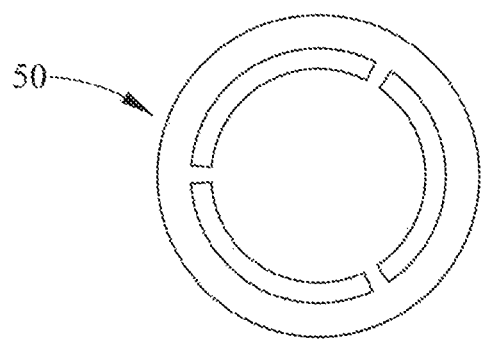
FIG. 3A is a top view of the high water alarm system of FIG. 1.
Figure 3B:
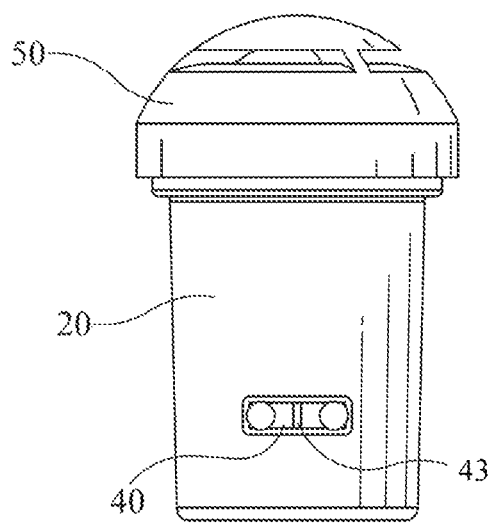
FIG. 3B is a side view of the high water alarm system of FIG. 1.
Figure 3C:
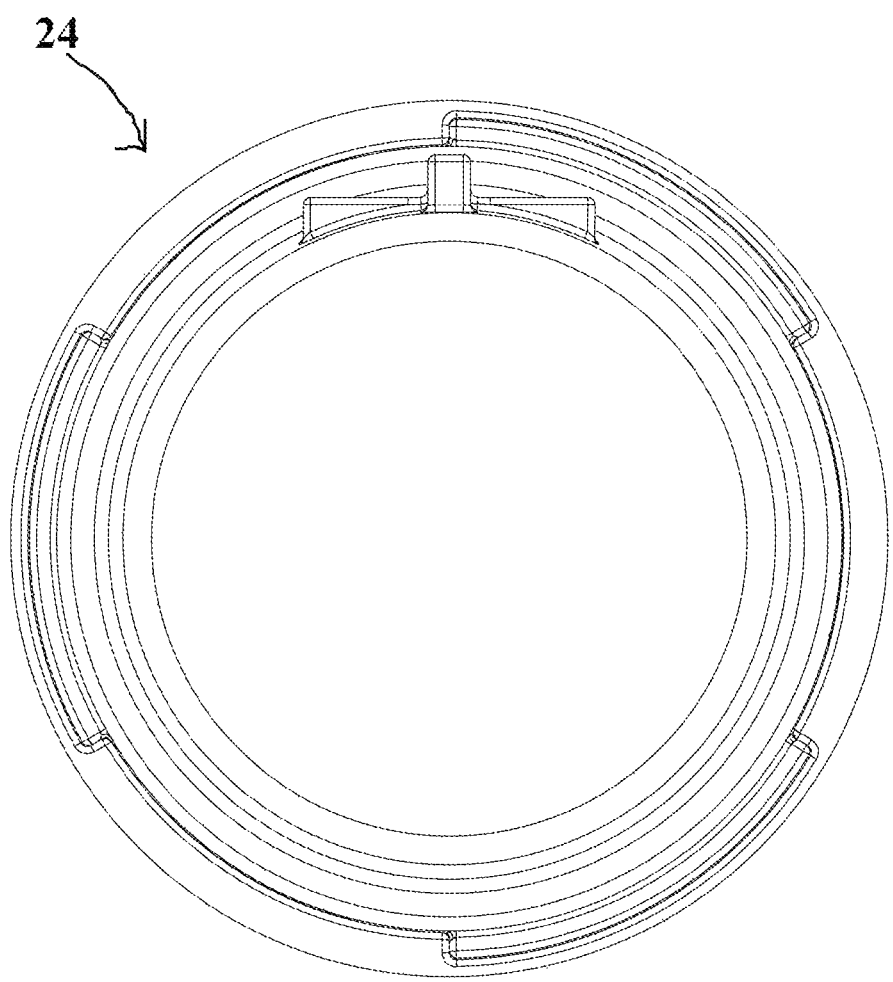
FIG. 3C is a bottom view of the high water alarm system of FIG. 1.
Figure 5:
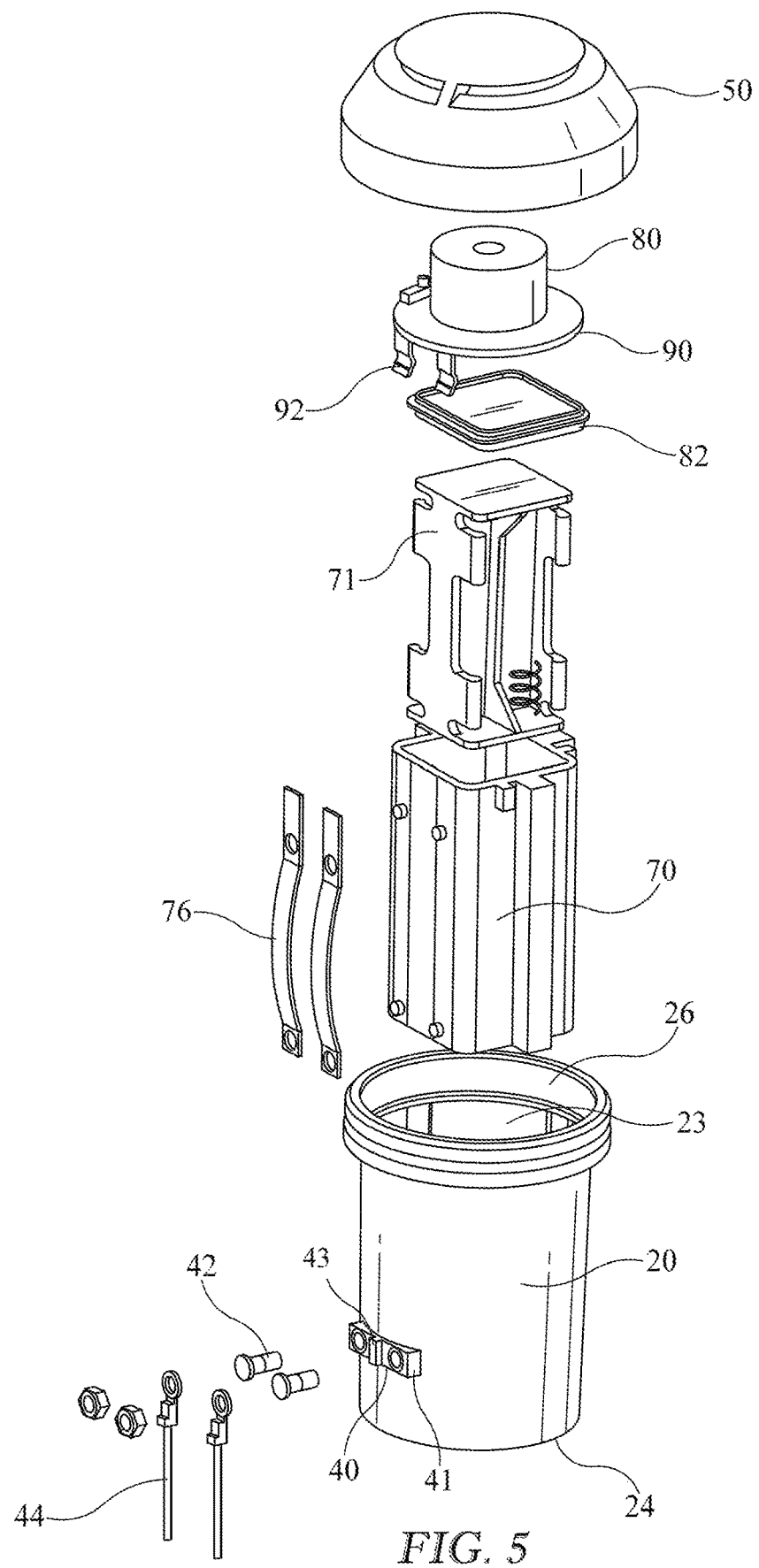
FIG. 5 is a perspective exploded view of the high water alarm system of FIG. 1.
Figure 12:
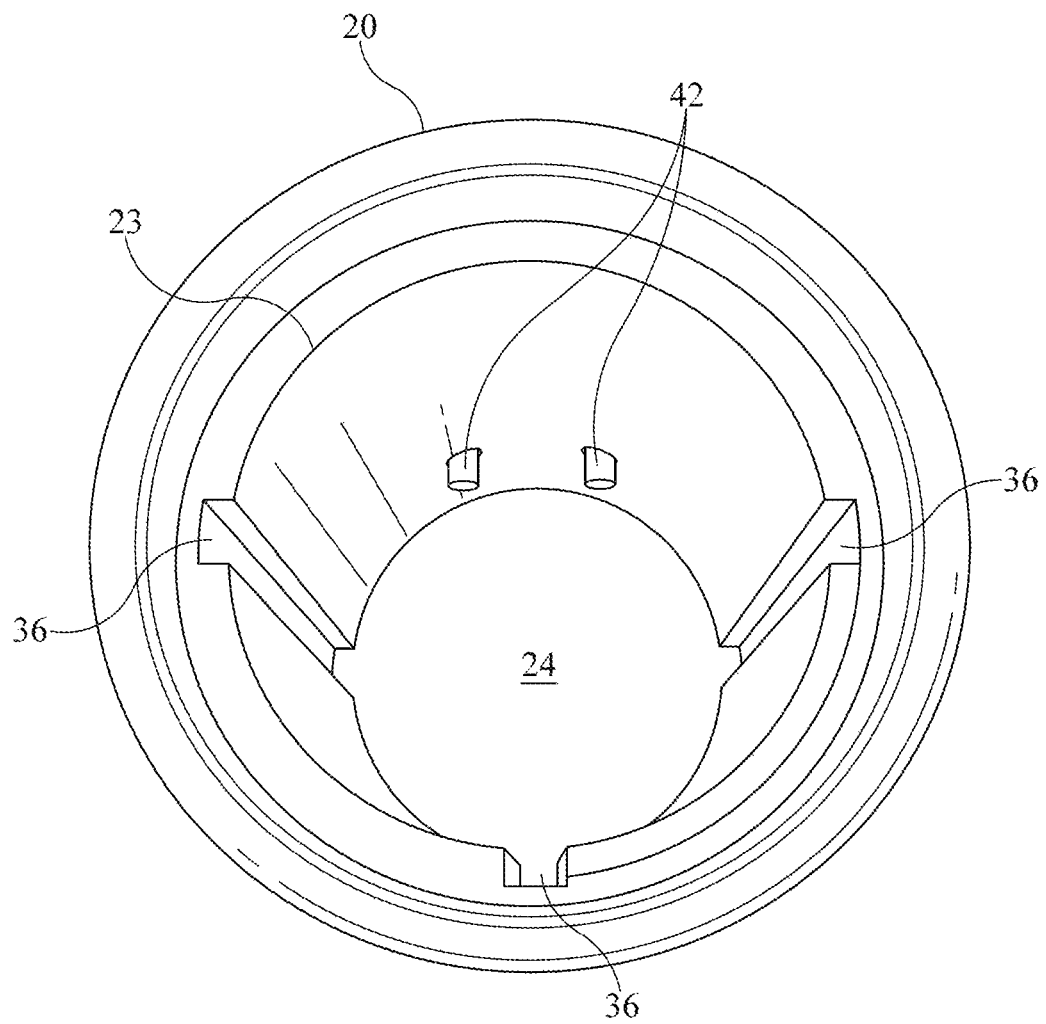
FIG. 12 is a top view of a main body of the high water alarm system of FIGS. 1 and 1A.
Figure 13:
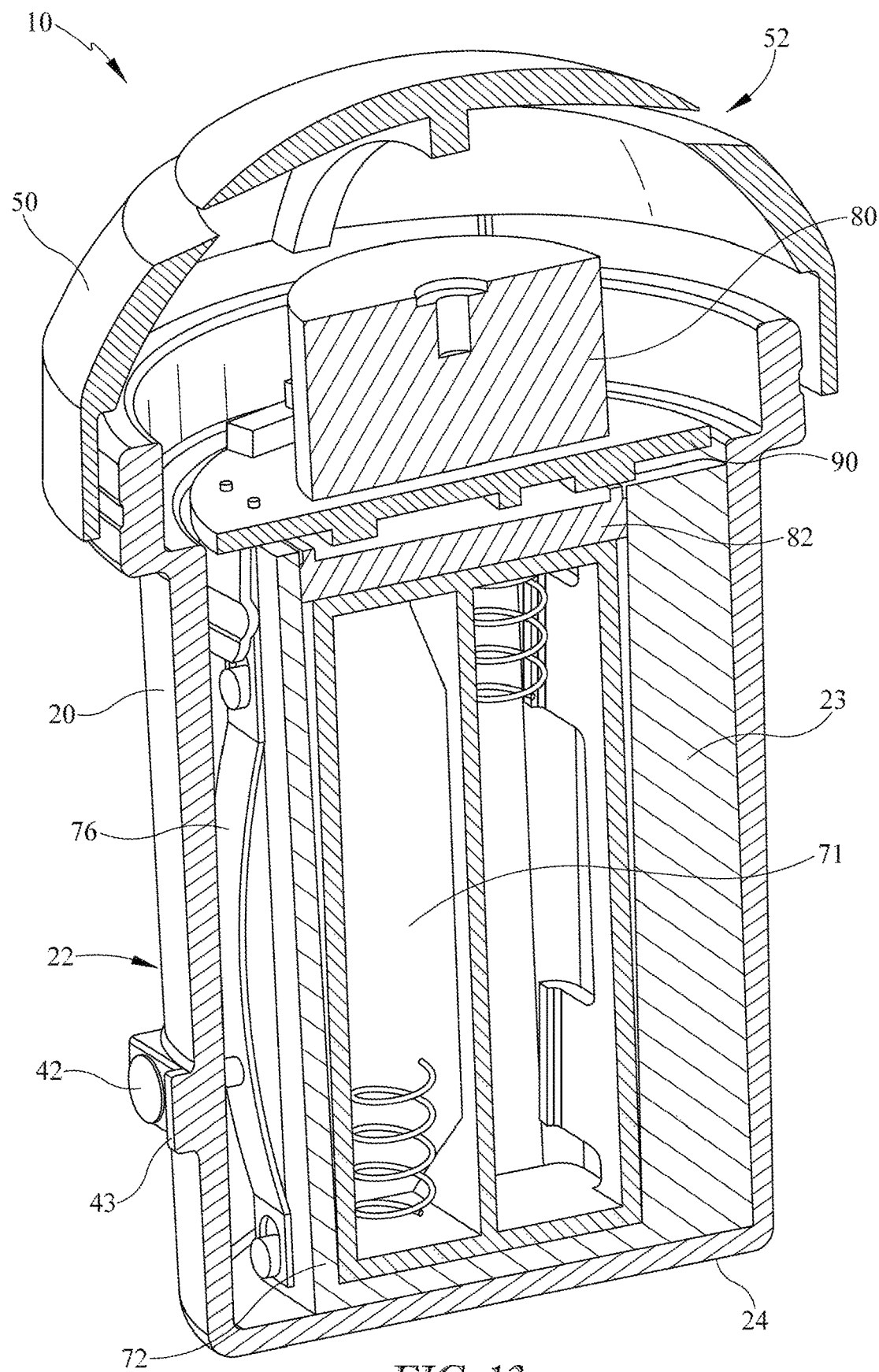
FIG. 13 is a side cutaway view of the high water alarm system of FIG. 1.
Figure 14:
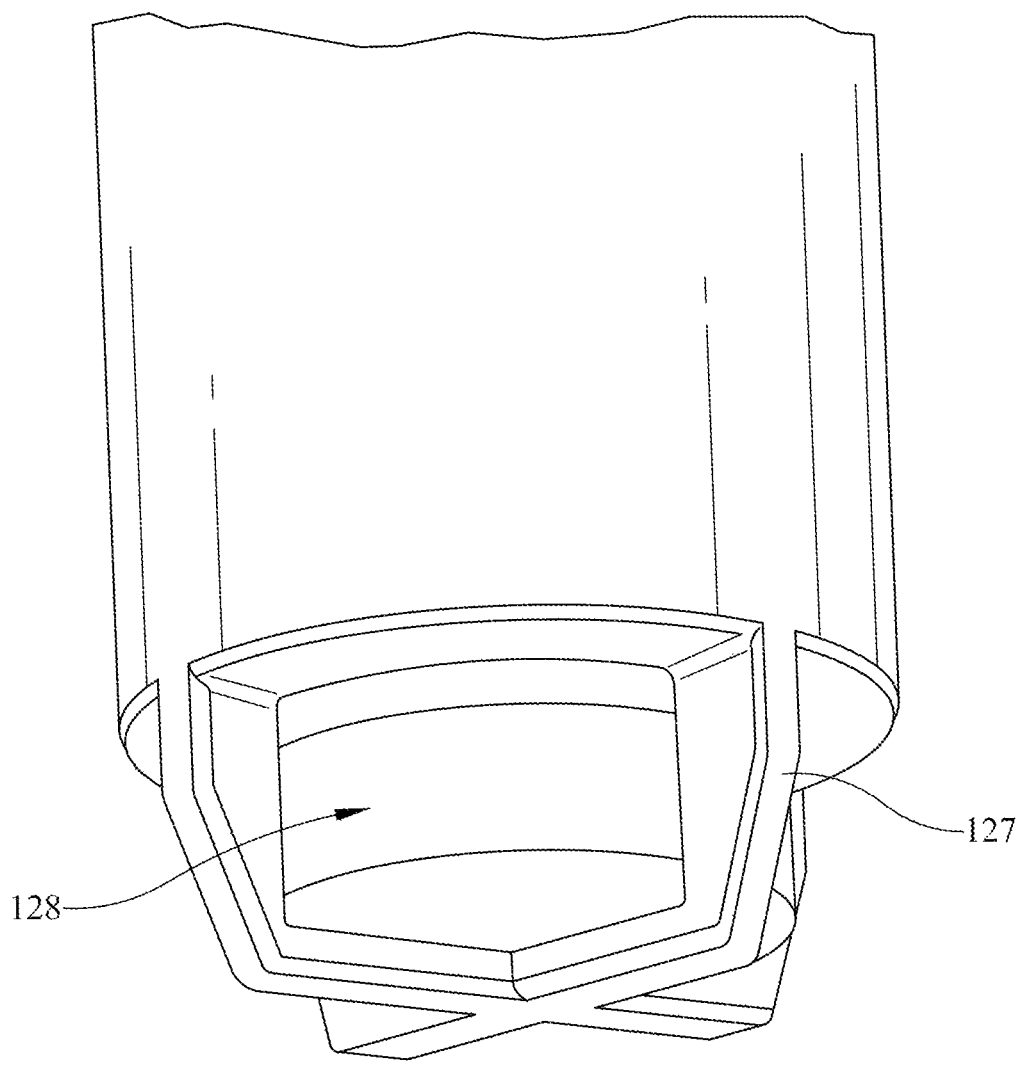
FIG. 14 is a side cutaway view of a lower portion of the high water alarm systems of FIGS. 2A, 2B and 2C.

An electrical water sensor, preferably a high water sensor (40), is an element of the high water alarm system (10). This sensor is secured to and, in one embodiment as shown in FIGS. 12 and 13, extends through the outer and inner wall (22,23) of the main body (20) from the surface of the outer wall through to the inside of the main body. The high water sensor is activated by contact with liquids present within the wastewater treatment or water containing system. Any type of high water sensor may be utilized that is securable to and, in one embodiment, through the main body of the high water alarm system, as long as it connects to an electrical system present within the main body to activate other components of that alarm system. The materials used for the high water sensor should be resistant to corrosion from the liquids and gases commonly present in the wastewater treatment system. This high water sensor can be located at any location on the main body. However, in one embodiment this sensor is located within about one to two inches (two to five centimeters) of the bottom (24) of the main body. In one embodiment, as shown in FIGS. 1, 3B and 5, the electrical water sensor includes a pair of contact probes (42), which extend through the side of the main body, as shown in FIGS. 12 and 13. These probes also extend through a support (41) for the contact probes that is secured to or a molded component of the outer wall of the main body, as shown in FIG. 1. In one embodiment this pair of probes is flush or nearly flush with the surface of the support to reduce interaction with solid material floating in the liquid contained in the tank. In one embodiment the system utilized to reduce corrosion utilizes an alternating current detection system across sensing probe terminals, which minimizes electrolysis over systems using direct current. The probes contact electrical spring strips (76), which are secured to a battery holder sleeve (70) that is secured within the main body (20). In one embodiment, as shown in FIG. 1, a baffle (43) is located between a pair of probes, which baffle extends outward further from the surface of the main body than do the pair of probes. This baffle helps to break surface tension of liquids that contact the contact probes once the level of liquids present in the wastewater system drops below the level of the high water sensor. In addition, the baffle helps to prevent solid material present within the tank from attaching to the probes. In an alternative embodiment, as shown in FIG. 1A, an extended baffle (45) extends vertically above and below support (41) on the side of the system. This embodiment provides further assistance in breaking the surface tension of liquids that contact the contact probes once a level of liquids present in the wastewater system drops below the level of the probes.

In a further embodiment, wire terminals (44) are secured to the main body or to the contact probes for use with an additional water level measuring system. See FIGS. 5 and 5B.

Figure 9:
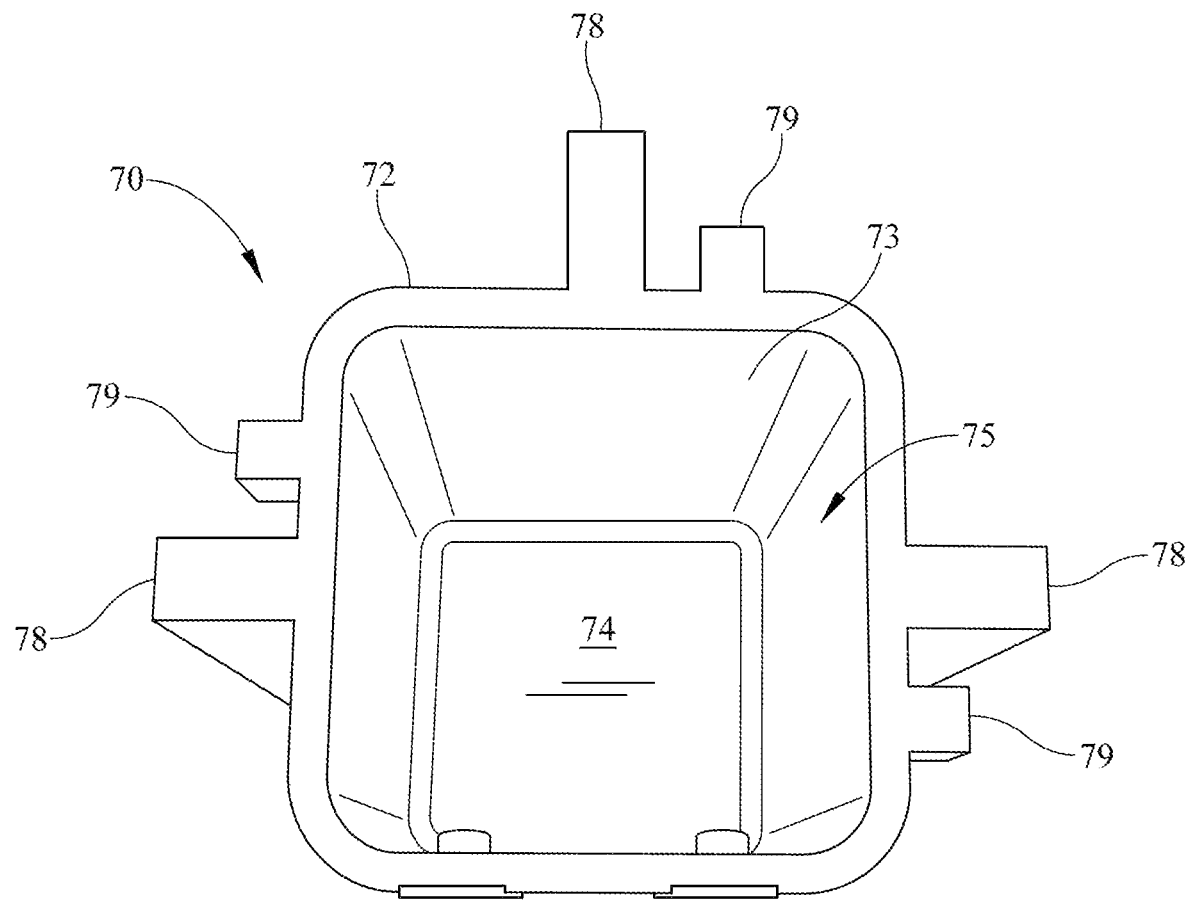
FIG. 9 is a top view of a battery container present within the high water alarm systems of FIGS. 1, 1A, 2A, 2B and 2C.
Figure 10:
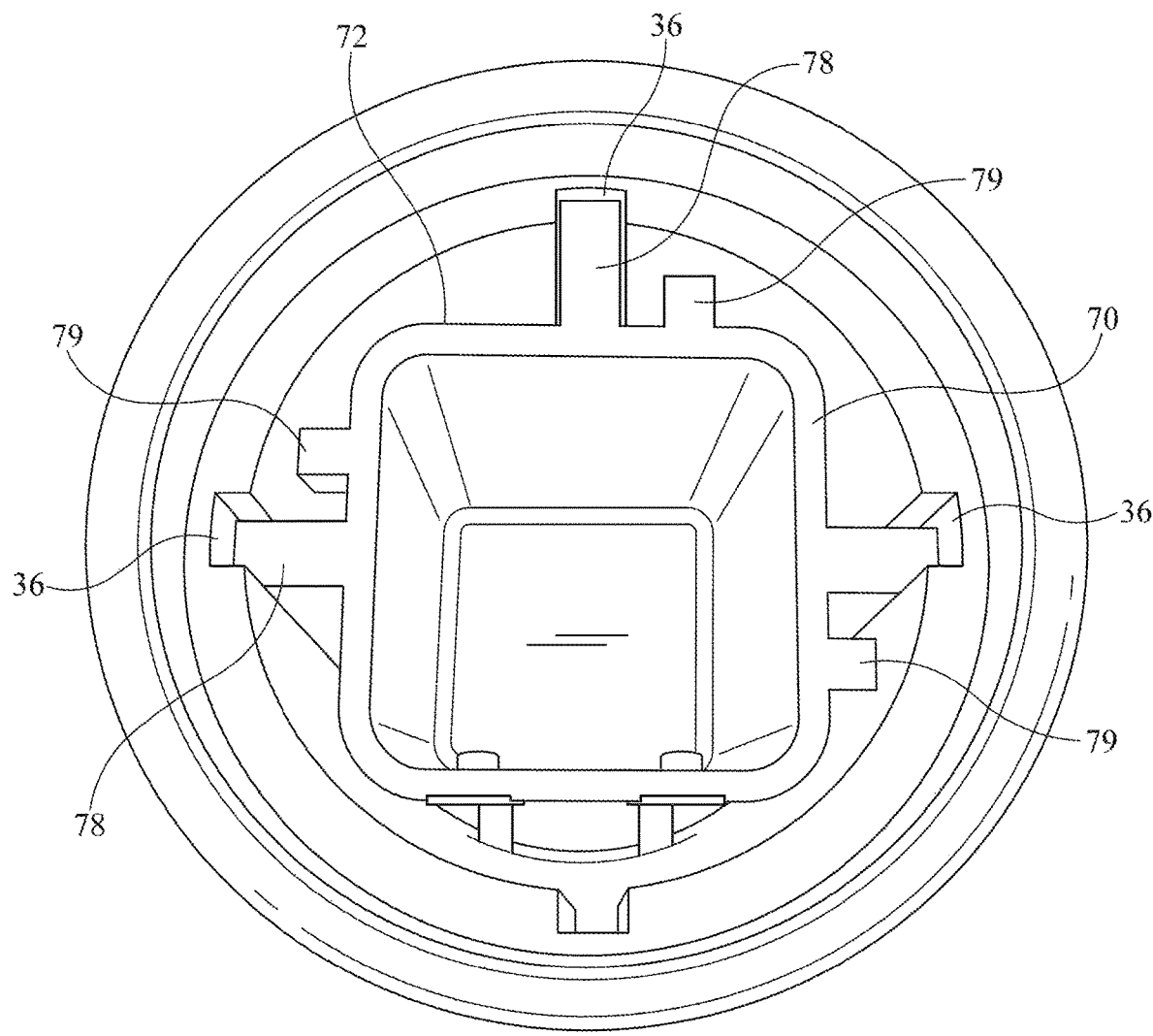
FIG. 10 is a top view of the battery container of FIG. 9 within the high water alarm system of FIGS. 1 and LA.

The battery holder sleeve (70) is secured within the main body (20), as shown in FIGS. 5, 10, 11, and 13. A series of slots (36) are provided in an inside surface of the inner wall (23) of the main body (20), as shown in FIGS. 10 and 12 with each slot located on a separate wall of the inside surface of the inner wall. These slots operate in coordination with pins (78, 79), which extend outward from the three sides of the outer wall (72) of the battery holder sleeve (70), as shown in FIGS. 9 and 10, to hold the battery holder sleeve in a specific directional placement within the main body of the high water alarm system. As shown in FIG. 10, there are two differing lengths of the pins which extend from the outer wall of the battery holder sleeve, longer pins (78) and shorter pins (79). Each of the longer pins fits into one of the slots in the inner surface of separate inner walls of the main body to hold the battery holder sleeve within the main body. Further, only three slots are utilized, each on separate walls, in combination with the three longer pins, so that the battery holder sleeve can only be installed in one configuration. This "keyed" arrangement prevents improper installation of the battery holder sleeve within the main body of the system.

Figure 11:
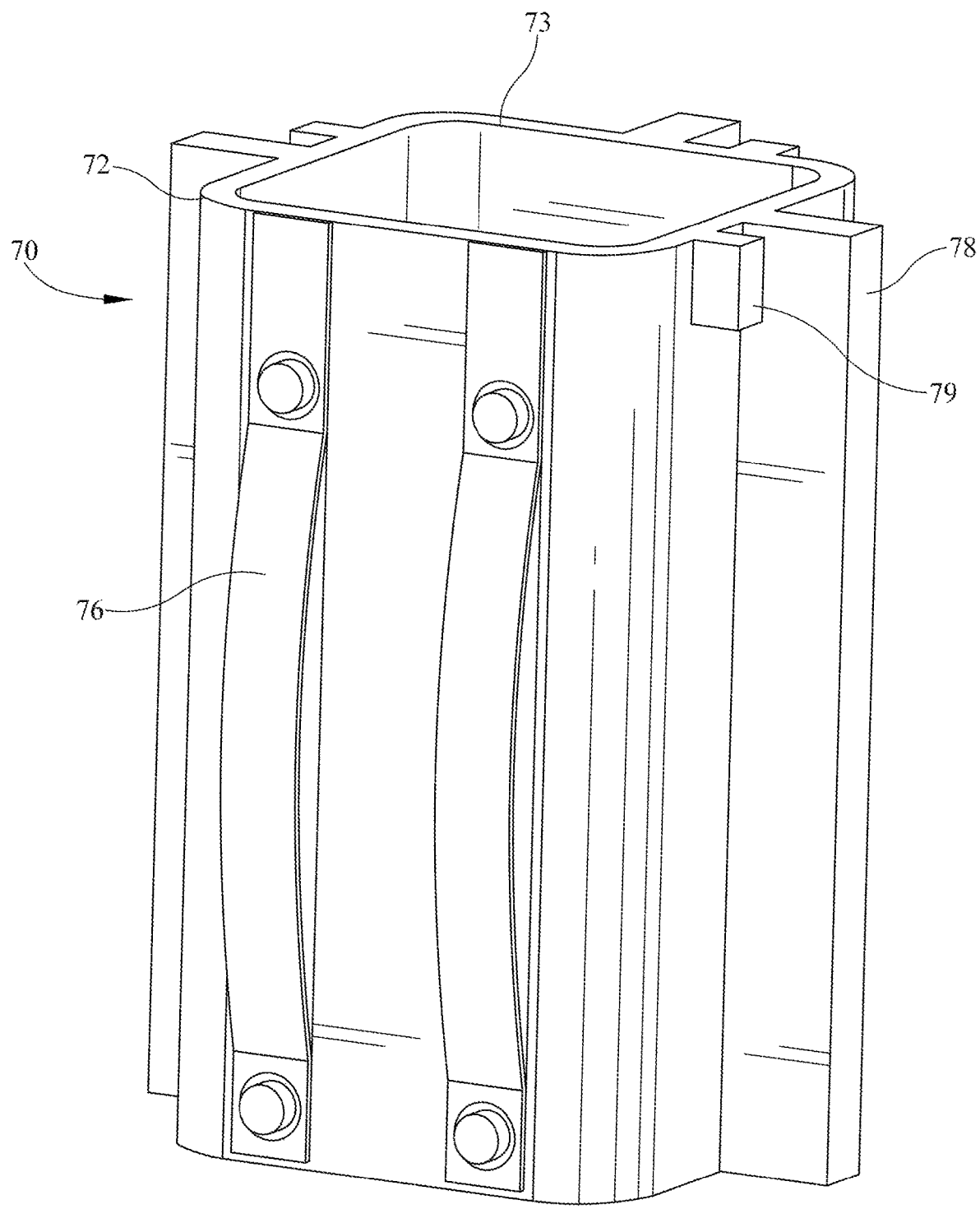
FIG. 11 is a perspective view of the battery container of FIGS. 5, 5A, 5B, 6 and 6A.

Secured to the side of the outer wall of the battery holder sleeve (70) that does not contain pins are electrical spring strips (76), which contact the contact probes (42) of the high water sensor, as shown in FIGS. 11 and 13, when the battery holder sleeve is installed within the main body.

Figure 8:
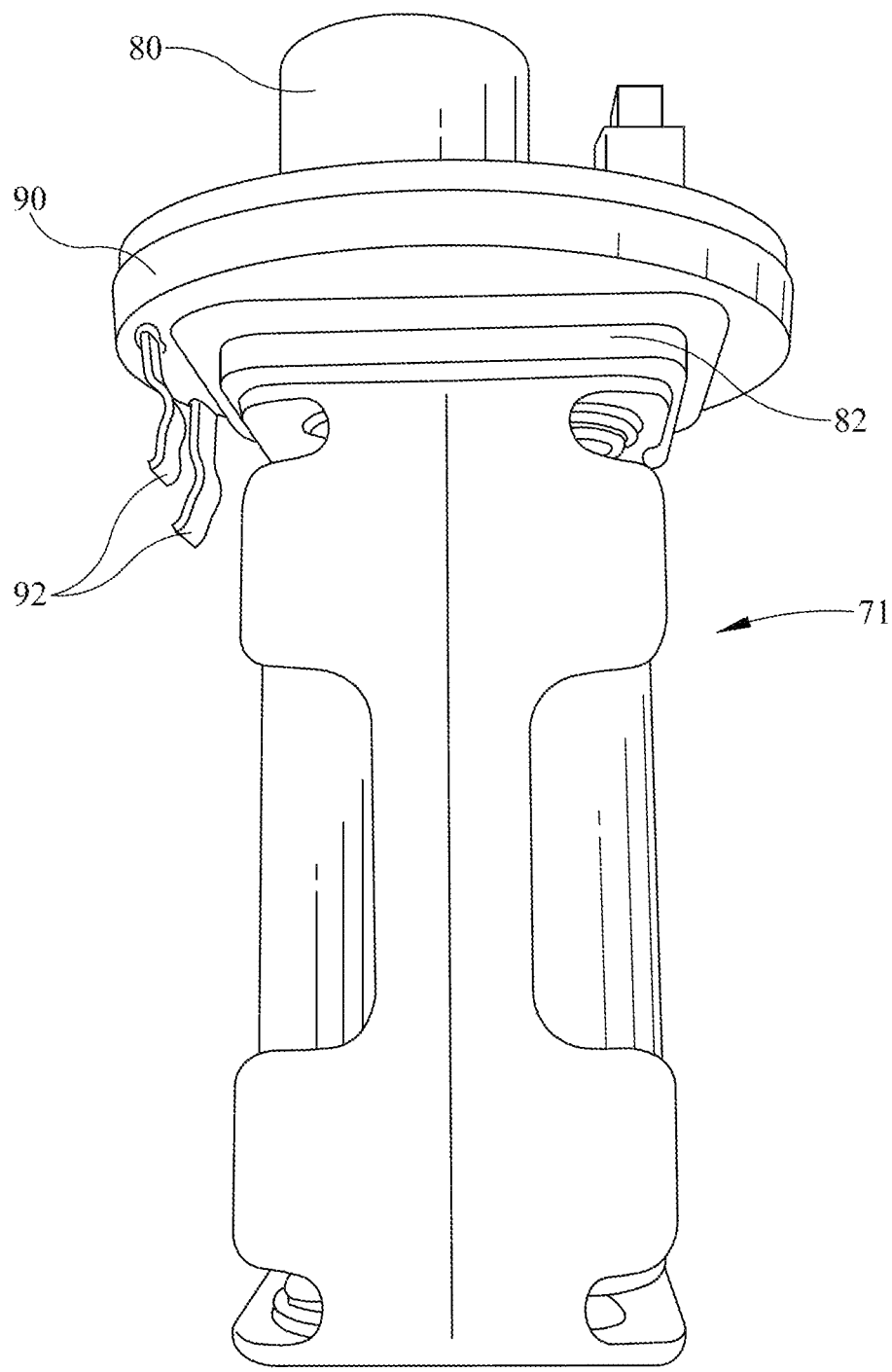
FIG. 8 is a perspective view of components inside the high water alarm systems of FIGS. 1, LA, 2A, 2B and 2C.

The battery holder sleeve (70), secured within the main body (20), includes an outer wall (72), an inner wall (73), a closed bottom (74), and an open top (75), which top is closed by a top of the battery container (71) when the battery container is secured within the battery holder sleeve. The battery container contains batteries, such as AAA batteries (not shown), to operate the electrical system for the alarm (80). Other forms of batteries can be used within the system. A conventional structure for retaining batteries within the battery container may be utilized, such as is shown in FIGS. 8 and 13. In one embodiment the battery container has a generally square cross-section. Further, a conventional system for opening the top of the battery holder sleeve permits easy insertion and withdrawal of batteries from the battery container. The design of those components can be modified, as needed.

Above the battery holder sleeve (70) and battery container (71), but within the high water alarm system, in one embodiment, is a gasket (82) and a circuit board (90), as shown in FIGS. 5, 8 and 13, which circuit board contains conventional electrical components to coordinate operation of all electrical components of the high water alarm system. In one embodiment the gasket (82) is installed between the battery container and the circuit board. In one embodiment the electrical components of the high water alarm system include, but are not limited to, the contact probes (42) of the high water sensor (40), which probes contact the spring strips (76), which are secured to the battery holder sleeve (70). Electrical contact clips (92), as shown in FIGS. 5 and 8, are secured to the circuit board (90) and contact the spring strips. The batteries within the battery container are in electrical connection with the circuit board to complete the circuit within the high water alarm system.

In one embodiment the alarm (80), as shown in FIGS. 8 and 13, includes a bell which makes an audible noise when contact is made between the contact probes (42) of the high water sensor (40) and liquids present within the wastewater treatment system. Alternatively, a siren or horn or a small speaker may be used. In another embodiment various controls are also present within the electrical system which permit the alarm to make an audible noise and/or be activated on a predetermined periodic basis, as determined by the circuit board and the other electrical components within the system. In one embodiment the alarm is connected to a signal amplifier (not shown) to enhance its effectiveness. In one embodiment, the sound of the alarm is at least about 80 db.

A further embodiment includes a wireless or wired system (not shown) to send a signal from the high water alarm to separate location, like a control panel, indicating the status of the alarm. Other appropriate conventional electrical components may also be present within the system.

Figure 7A:
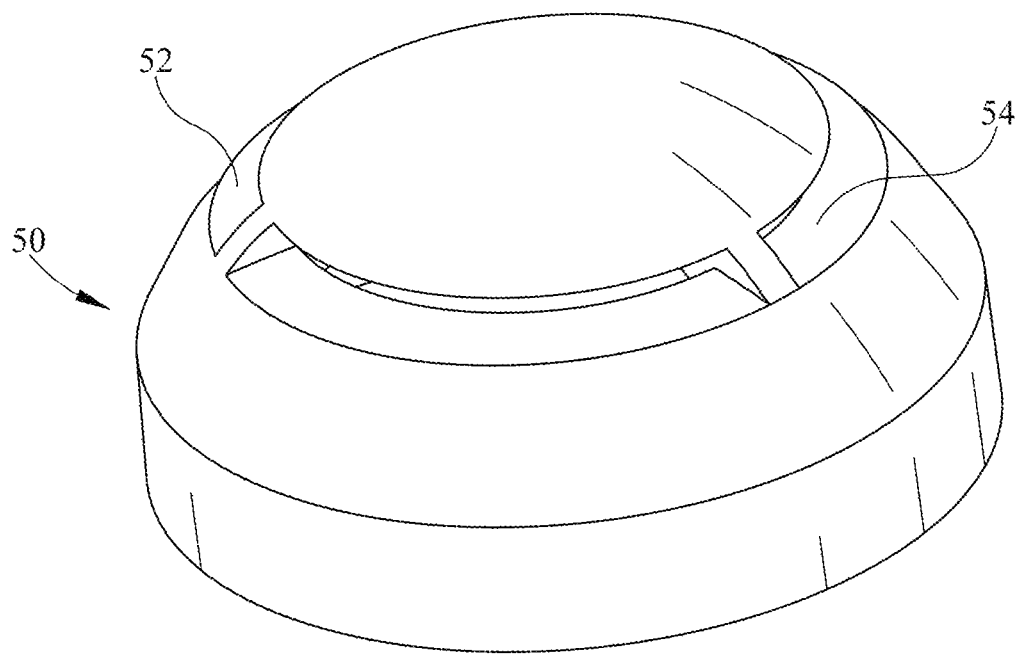
FIG. 7A is a perspective view of a cover for the high water alarm systems of FIGS. 1, LA, 2A, 2B and 2C.
Figure 7B:
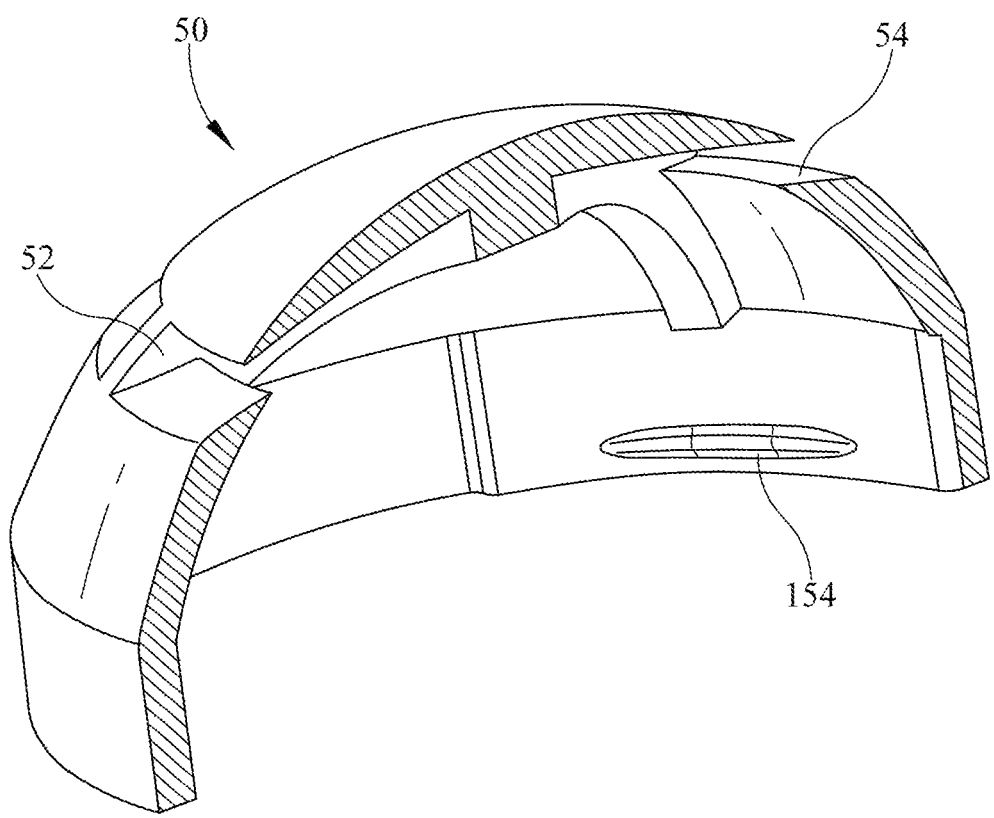
FIG. 7B is a perspective cutaway view of the cover of FIG. 7A.

Above this alarm system (80) and circuit board (90) is a cover (50) for the high water alarm system with air vent slots (52), as shown in FIGS. 1, 5, 7A and 7B. These vents can be in any shape, size, or structure, as desired. However, in one embodiment, as shown in FIGS. 7A and 7B, the vents include a downwardly sloping slot (54), which allows water that condenses on the cover to drip off the sides of the cover without entering the high water alarm system. The cover is secured on the open top of the main body (20) by a conventional structure that permits easy access to the inside of the high water alarm system for servicing and includes structure permitting removal and replacement of the batteries. In one embodiment the cover is screwed onto the main body using a threaded structure.

Figure 2A:
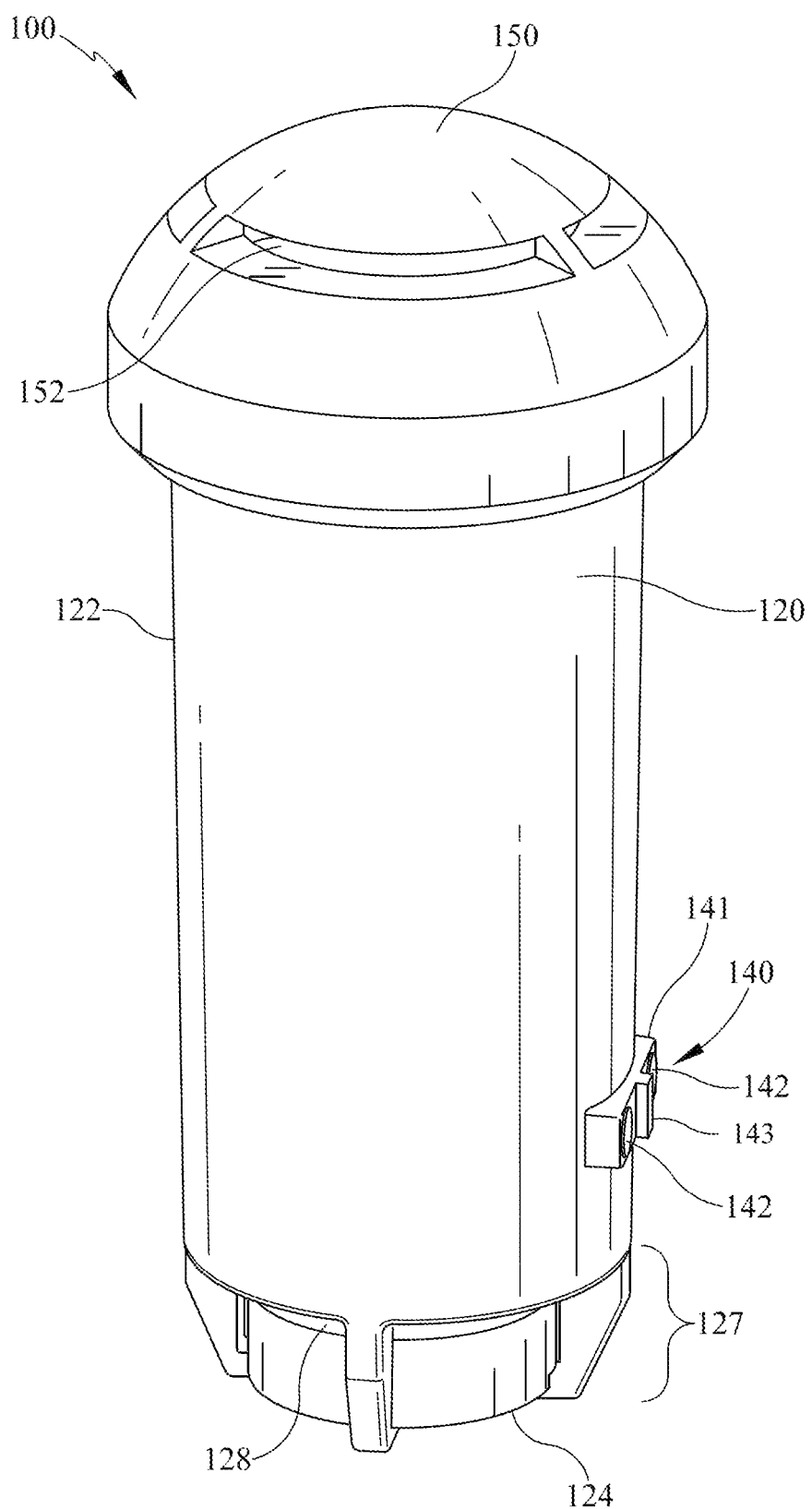
FIG. 2A is a perspective view of a second embodiment of a high water alarm system utilized with a wastewater or water treatment system that includes a gas vent and filter.
Figure 2B:
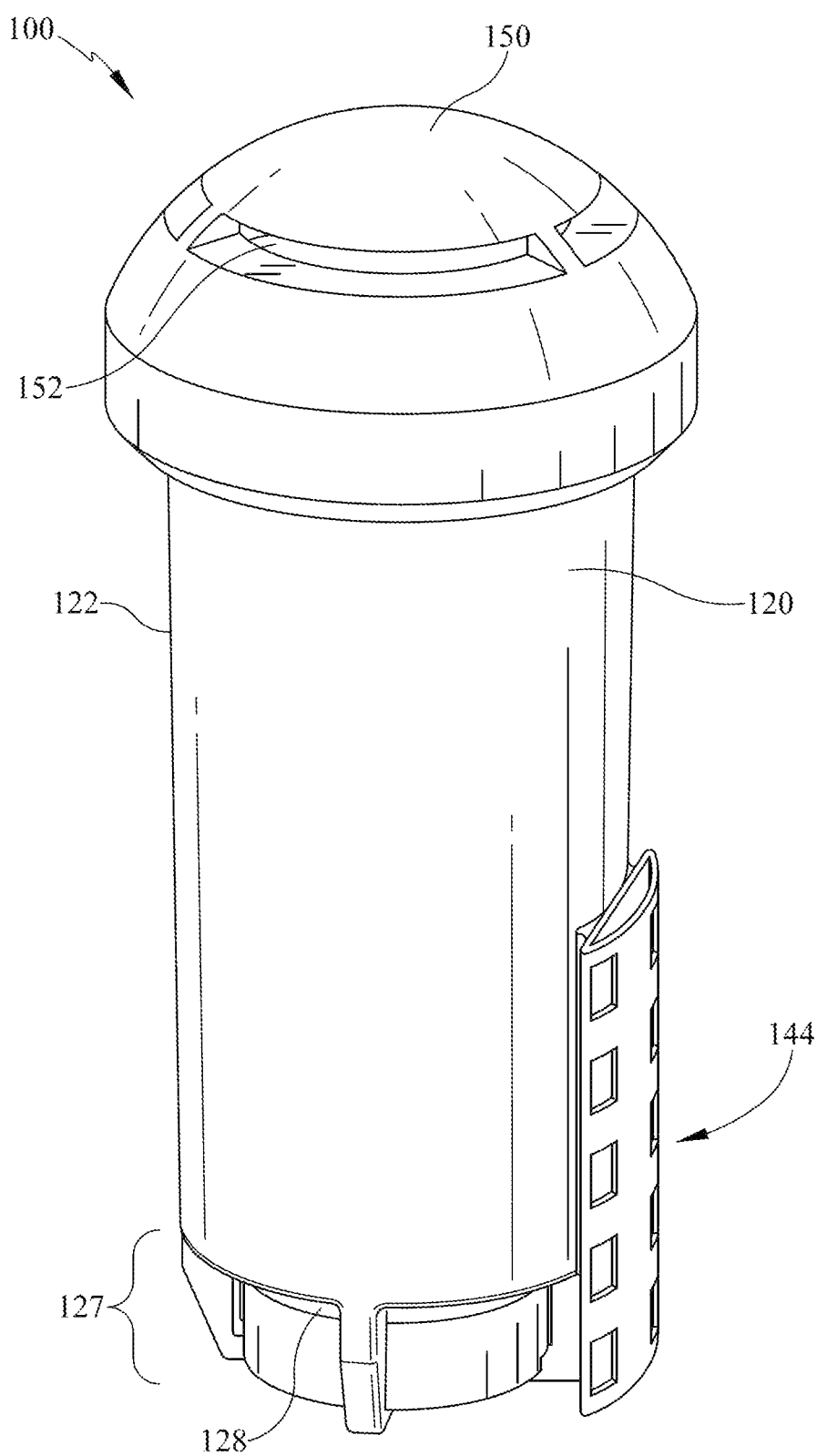
FIG. 2B is a perspective view of a modified second embodiment of FIG. 2A.
Figure 5A:
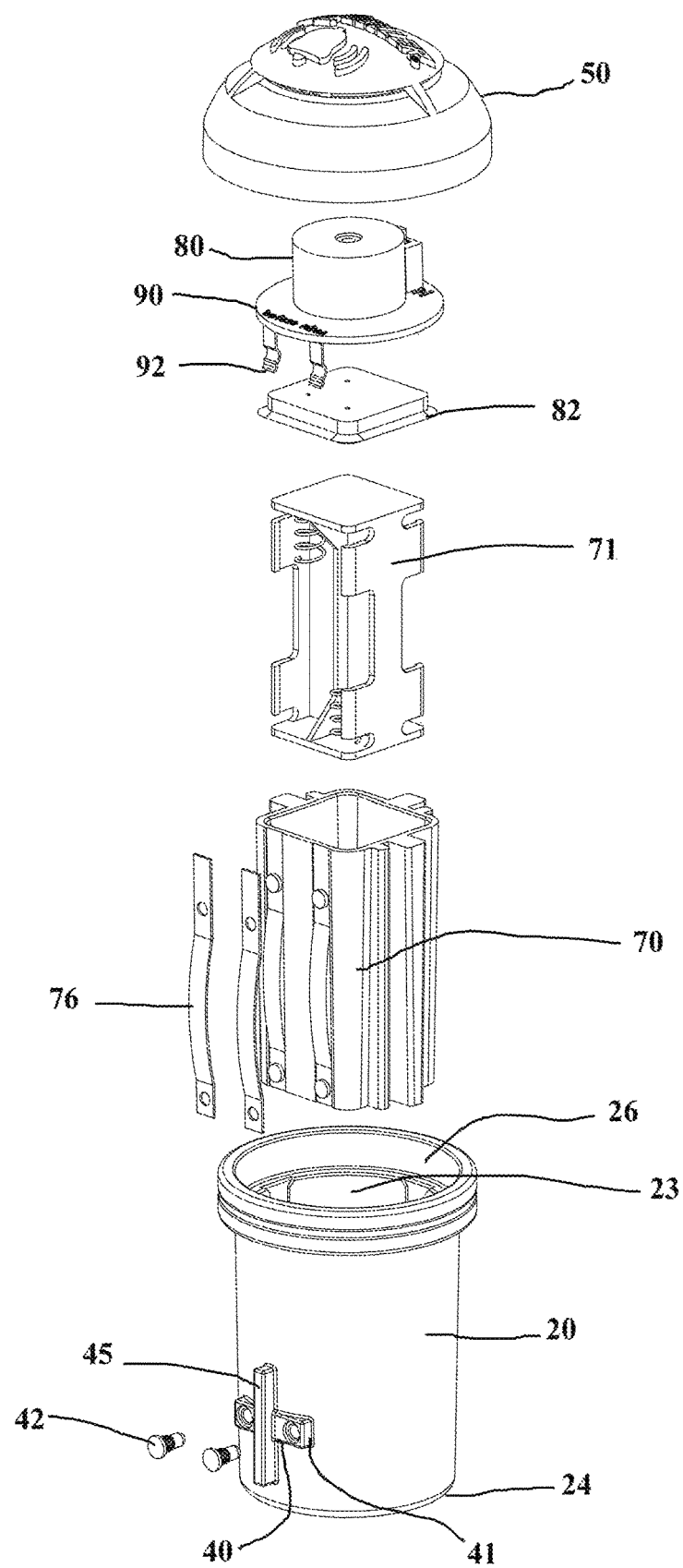
FIG. 5A is a perspective exploded view of the high water alarm system of FIG. 1A.
Figure 5B:
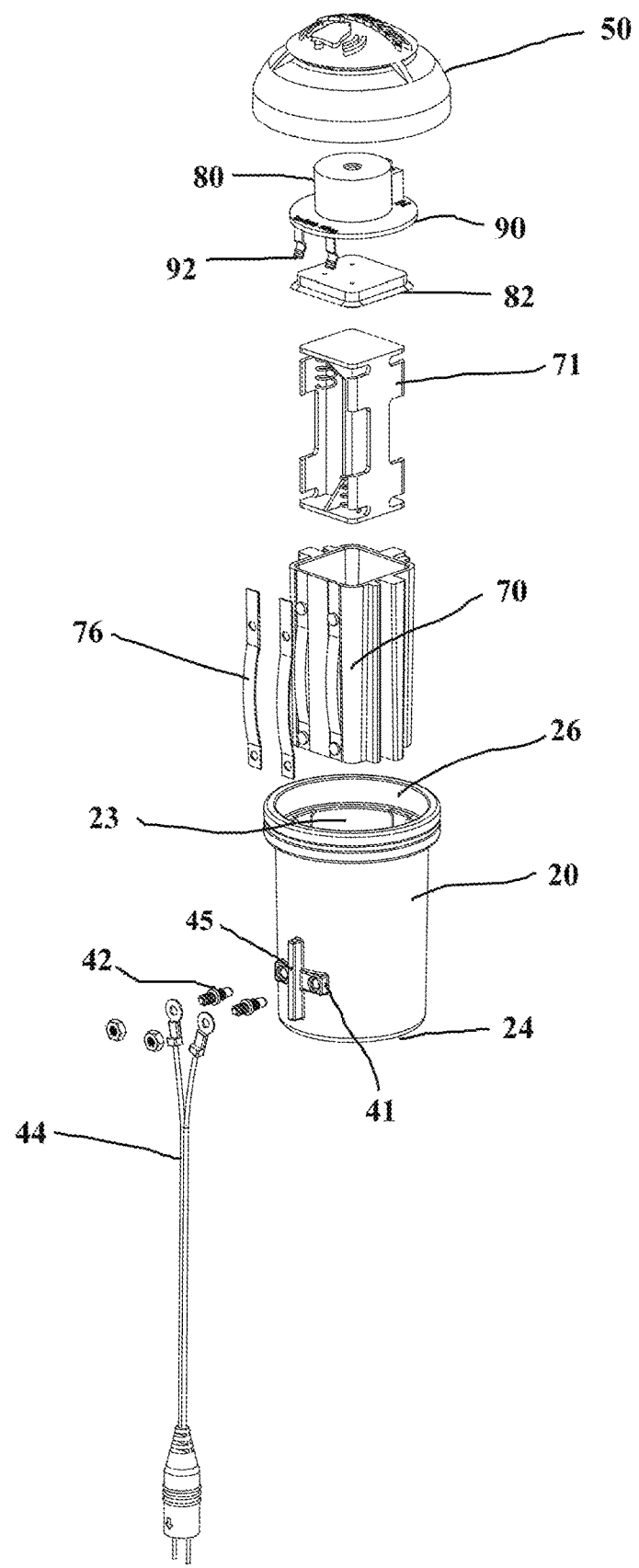
FIG. 5B is a perspective exploded view of an alternative embodiment of the high water alarm system of FIG. 1A.
Figure 6:
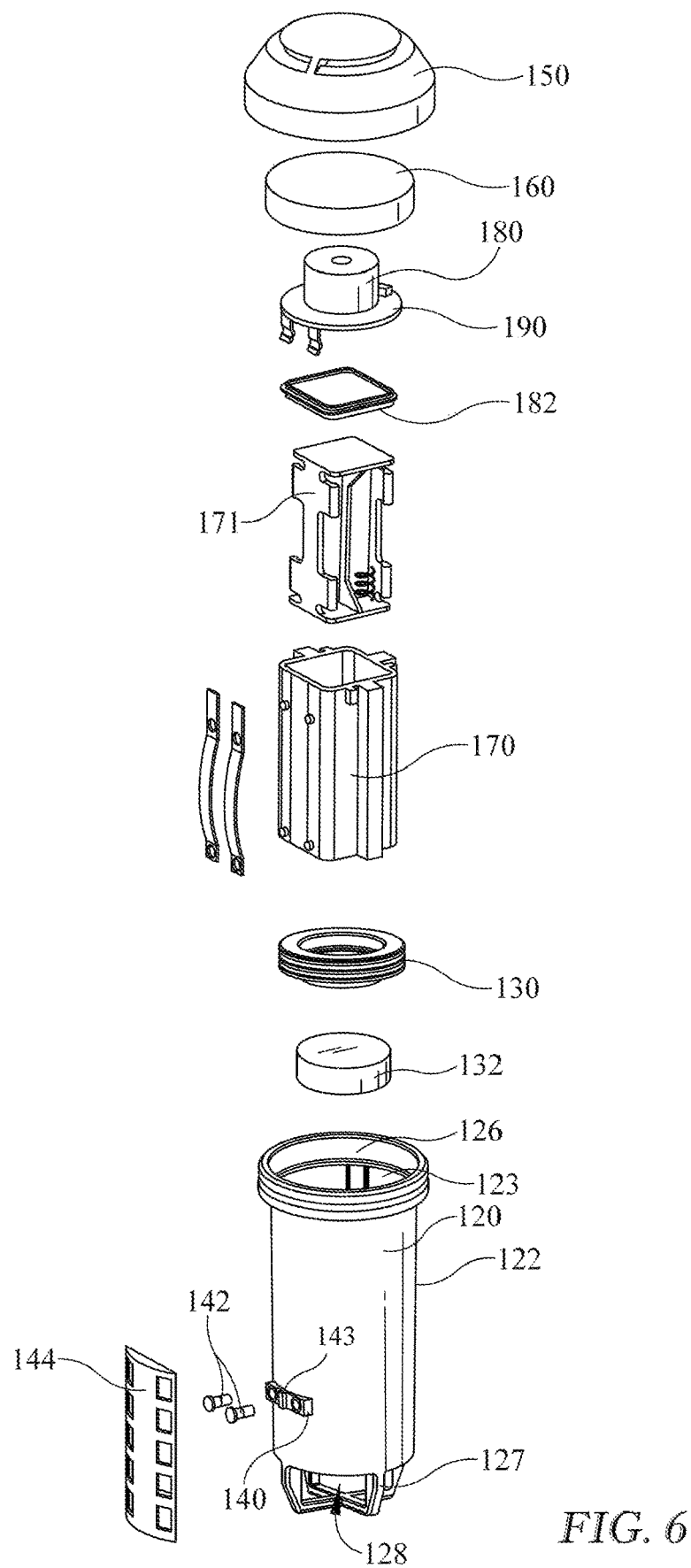
FIG. 6 is a perspective exploded view of the modified second embodiment of the high water alarm system of FIG. 2B.

A further embodiment of the high water alarm system (100) is shown in FIGS. 2A, 2B, 2C, 4A, 4B, 4C, 4D, 6 and 6A. This embodiment adds a contact probe cover (144), a gas filter (160), and a vent valve ring seal (130) with a float (132) to the embodiment shown in FIGS. 1 and 5. This second embodiment is an alternative, integrated gas vent and high water alarm system (100), which is designed for utilization where use of these additional components is authorized. Many of the components of this integrated gas vent and high water system (100) are similar to or the same as those of the first embodiment of a high water system (10). These similar components include a cylindrical main body (120), a high water sensor (140), including one or more contact probes (142) with a baffle (143) secured to or molded on a support (141), battery holder sleeve (170), battery container (171), circuit board (190), gasket (182), alarm (180), and cover (150), as shown in FIG. 6. Another view of this alternative embodiment is shown in FIGS. 3D, 5A and 5B.

Figure 2C:
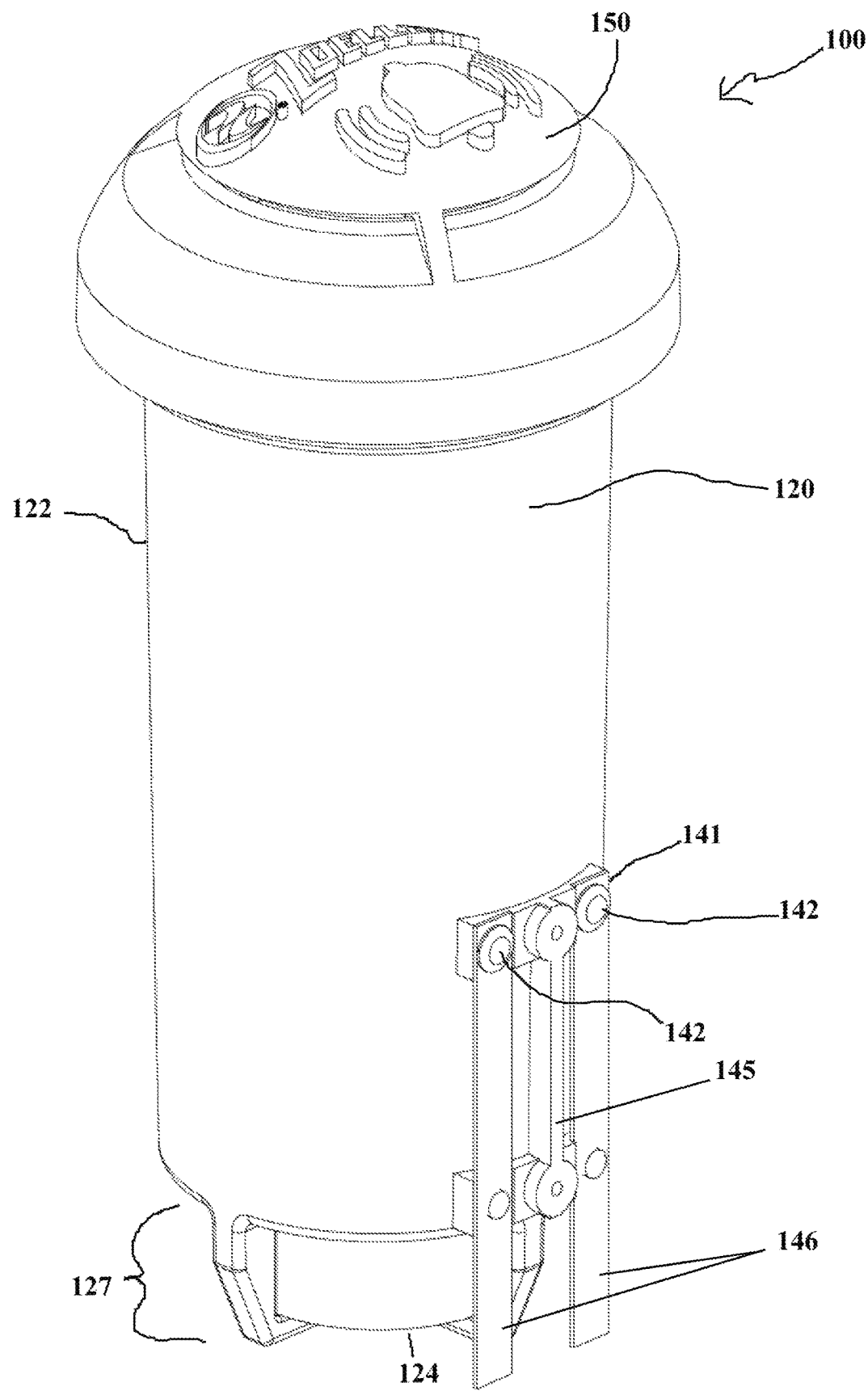
FIG. 2C is a perspective view of an alternative embodiment of the second embodiment of FIG. 2A.
Figure 3D:
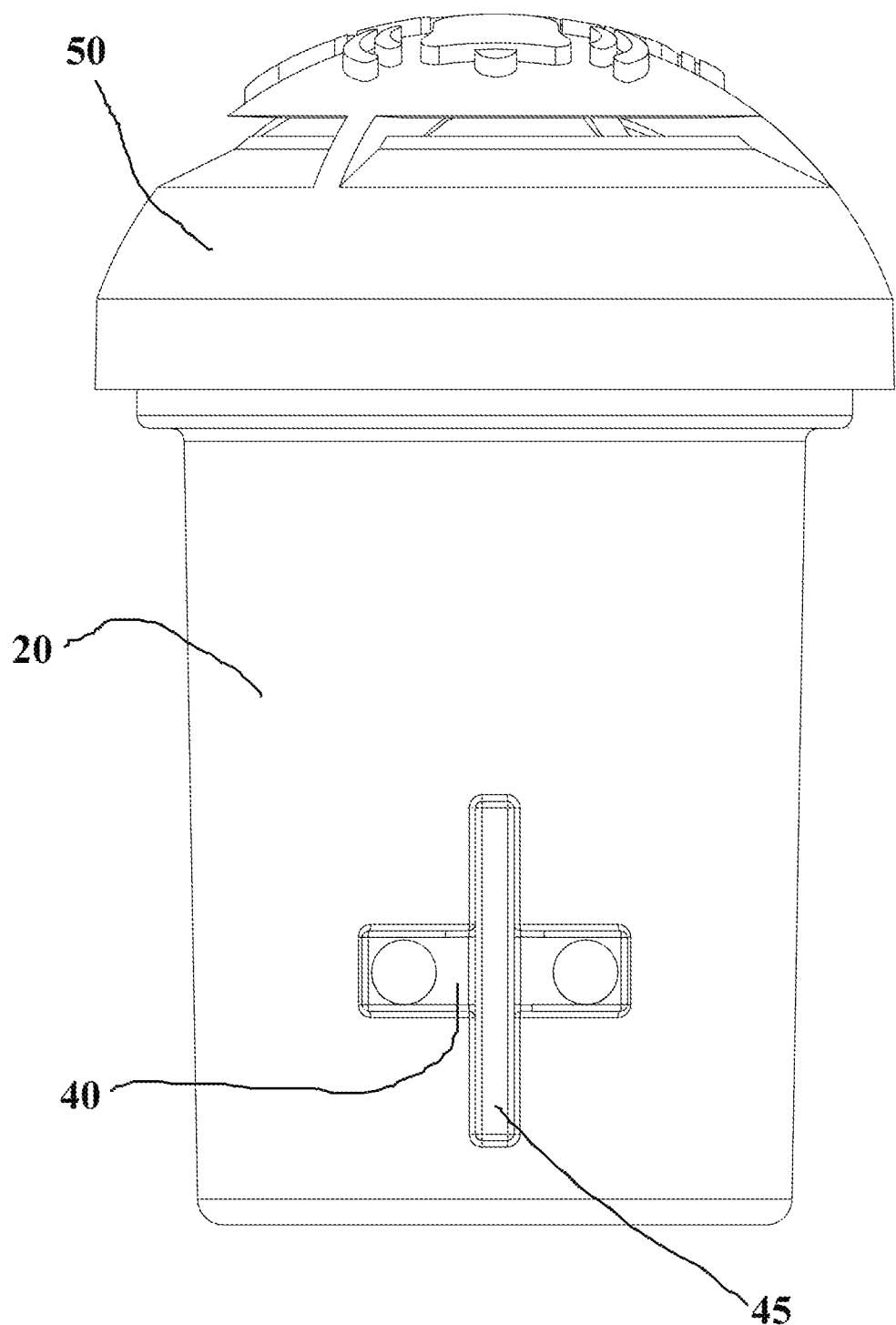
FIG. 3D is a side view of the high water alarm system of FIG. 1A.
Figure 4A:
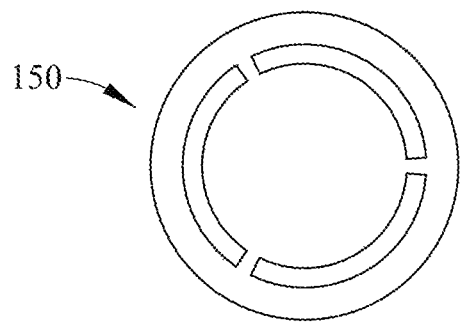
FIG. 4A is a top view of the second embodiment of the high water alarm system of FIG. 2A.
Figure 4B:
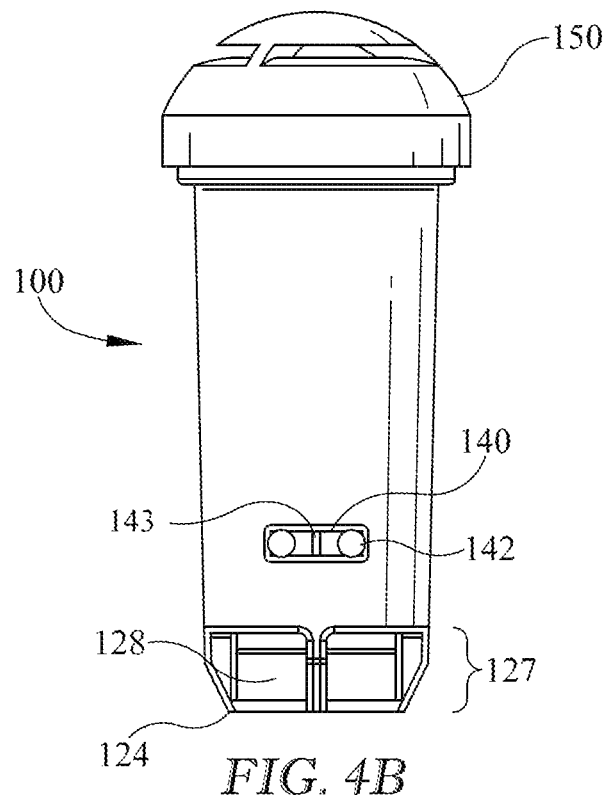
FIG. 4B is a side view of the second embodiment of the high water alarm system of FIG. 2A.
Figure 4C:
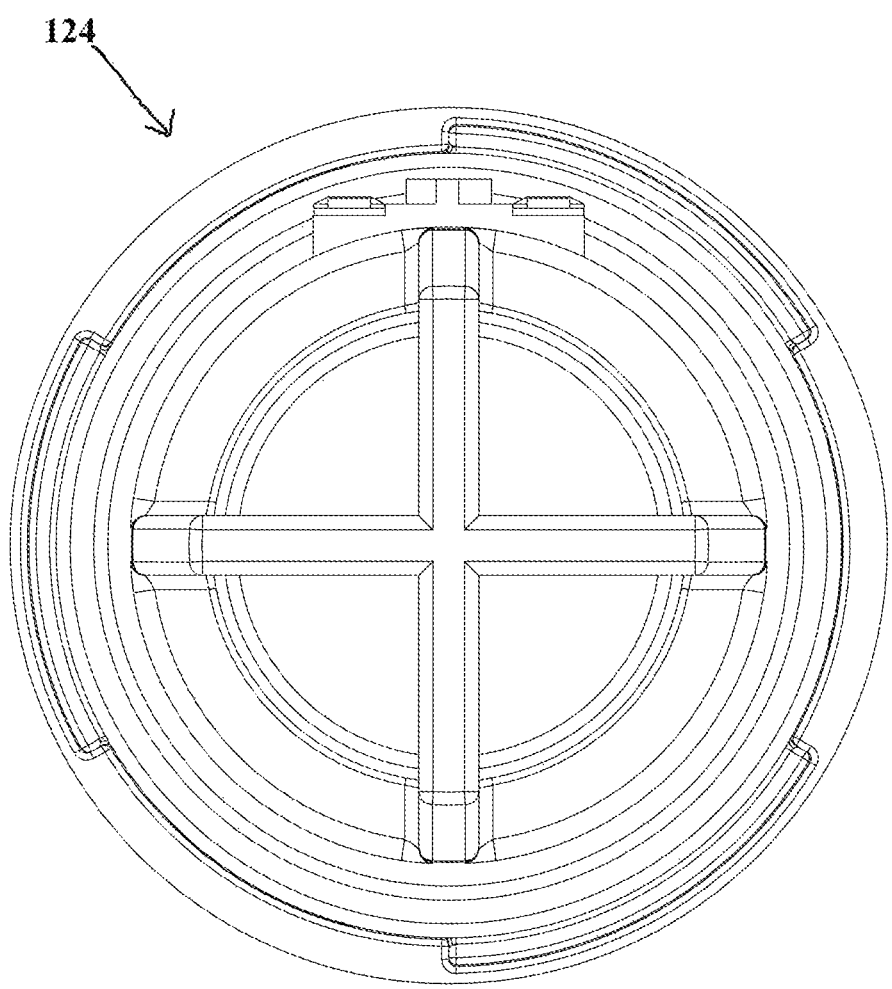
FIG. 4C is a bottom view of the second embodiment of the high water alarm system of FIG. 2A.
Figure 4D:
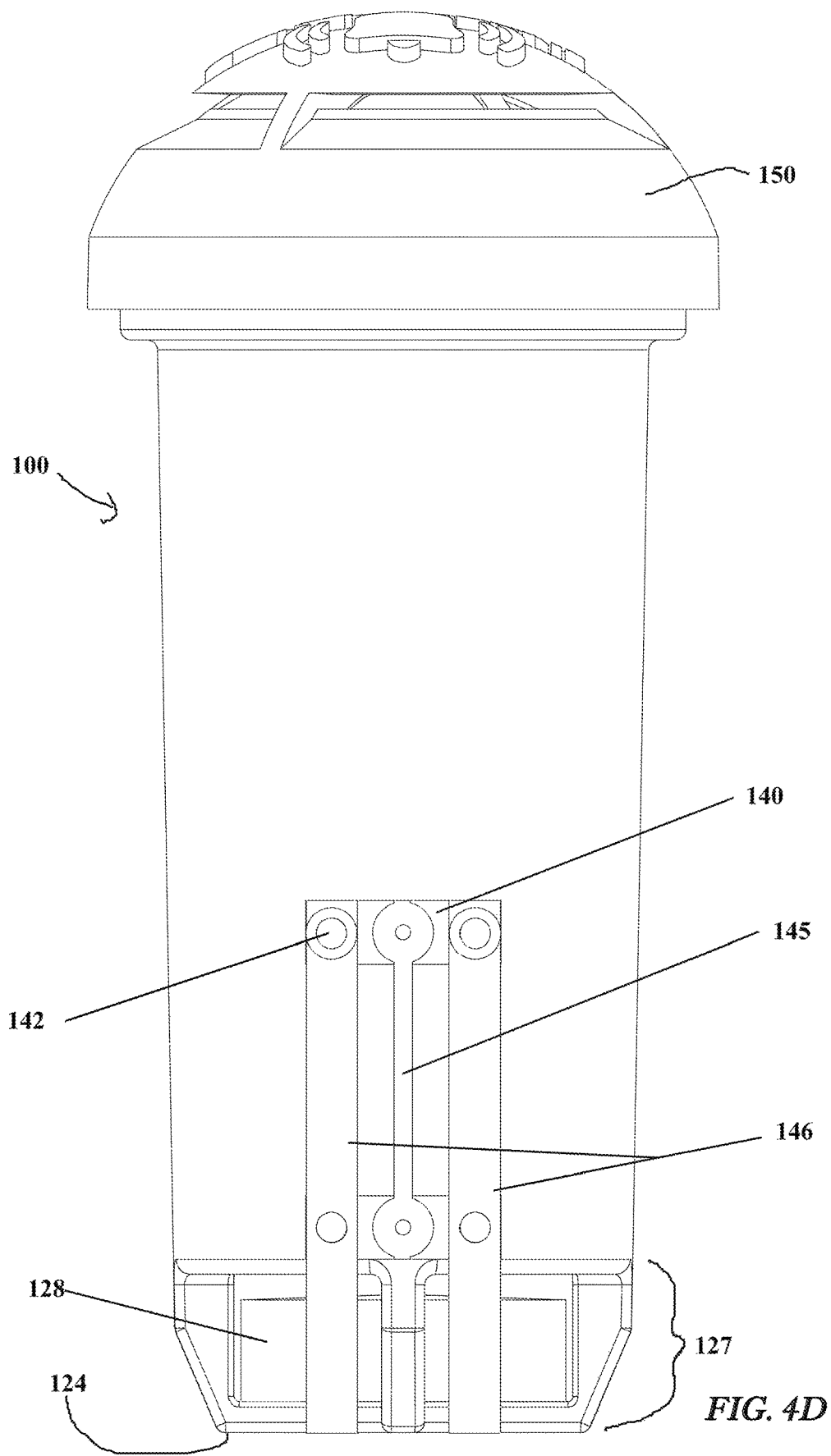
FIG. 4D is a side view of the high water alarm system of FIG. 2C.
Figure 6A:
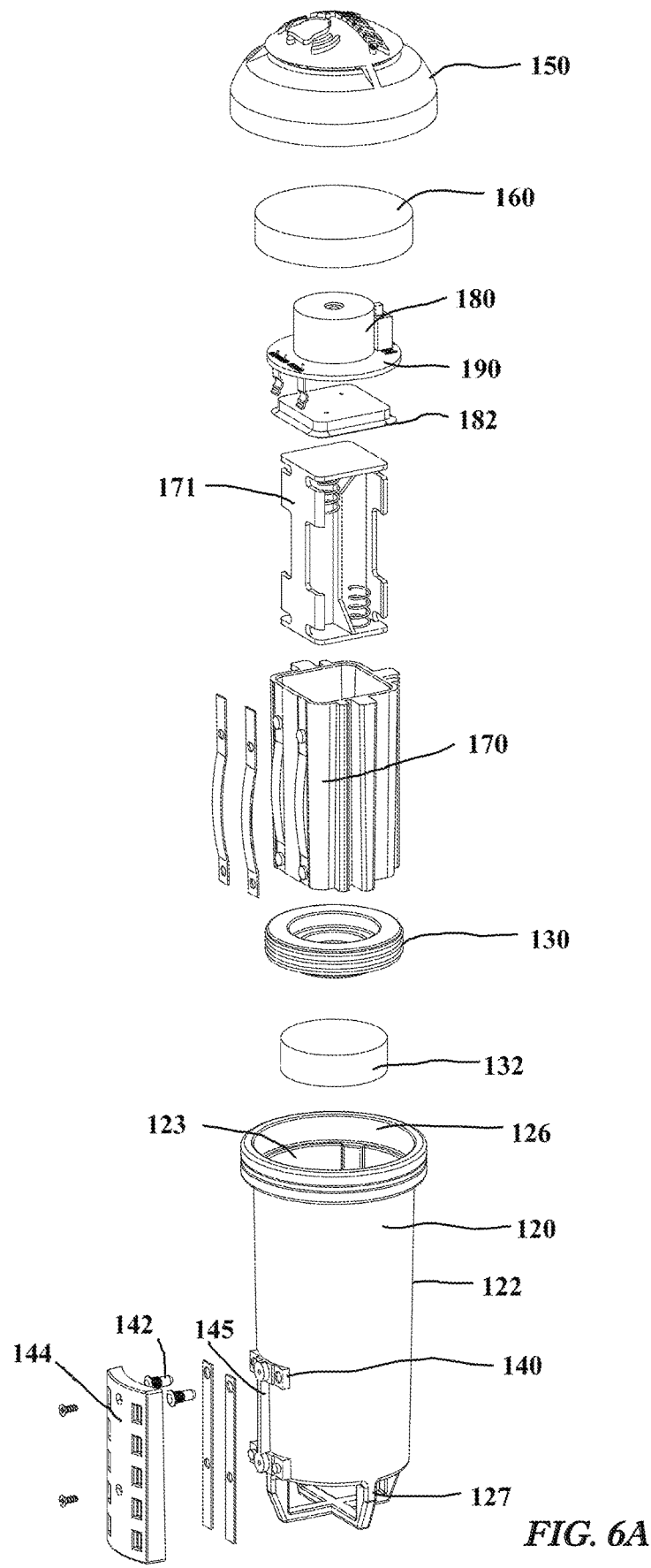
FIG. 6A is a perspective exploded view of the embodiment of the high water alarm system of FIG. 2B.

In a further alternative embodiment, the liquid contacting probes attached to the integrated gas vent and high water system are modified, as shown in FIGS. 2C, 4D and 6A. In this alternative embodiment, there is secured to the contact probes (142) contact probe sensor strips (146), as shown in FIG. 6A. These strips extend down the side of the integrated gas vent and high water system to a location close to or at the bottom of that system. These contact probe sensor strips, in one embodiment, are copper strips, which are secured onto the side of integrated gas vent and high water system. The materials used for these sensor strips should also be resistant to corrosion from the liquids and gases commonly present in the wastewater treatment system. In one embodiment the system utilized to reduce corrosion utilizes an alternating current detection system across sensing probe terminals, which minimizes electrolysis over systems using direct current. These strips are secured to the side of the integrated gas vent and high water system by use of the contact probes (142) and other conventional securing systems. Between the two contact probe sensor strips is an extended baffle (145). The length of this extended baffle can be modified as needed to protect the sensor strips, with one embodiment shown in FIGS. 4D and 6A.

To assist in operation of the high water sensor (140), in one embodiment, the high water sensor and/or a portion of the contact probe sensor strips (146) are secured to the main body at a location below the level of the float (132) and vent valve ring seal (130).

Referring to FIGS. 2A, 2B, 6 and 14, note that main body (120) of the integrated gas vent and high water alarm system (100) has a different structure than the main body (20) of the first embodiment of FIG. 1. The main body (120) of this second embodiment includes a generally cylindrical main body with outer wall (122) and inner wall (123). This main body also includes an open top (126) but with a lower portion (127) containing openings (128) therewithin. The openings (128) in this lower portion (127) of the main body, as shown in FIGS. 2A, 2B, 6 and 14, permit inflow of water, wastewater, and gases from the wastewater treatment system. The lower portion of the main body encloses a vent valve ring seal (130) with float (132). Upon entry of liquids through the openings in the lower portion of the main body, the float rises to close off the lower portion of the main body to prevent water and wastewater from entering the remaining portions of the main body of the system. Any type of vent valve and float combination may be utilized which prevents liquids contained within a wastewater treatment system from entering the system above the float and seal.

As a further embodiment, the contact probe cover (144) is secured to the outside of the main body (120) of the system (100), as shown in FIGS. 2B and 6A. This contact probe cover contains openings on its sides and is open at its lower edge to permit liquids from the wastewater system to enter the contact probe cover and contact the contact probes (142).

This contact probe cover protects the high water sensor from interaction with solid materials present in the wastewater system that can interfere with the operation of the contact probes. In a further embodiment this contact probe cover can also be utilized with the first embodiment of the high water alarm system. (Not shown.)

In one embodiment baffle (143) is present between the threaded contact probes (142), as shown on FIG. 2A. Both the baffle and the contact probes are supported by a support (141), which is secured to or a component of the main body of the high water alarm system.

An alternative embodiment utilizes an extended baffle (145), as shown in FIGS. 2C, 4D and 6A, wherein the extended baffle is extended down the side of the integrated gas vent and high water system and runs between the contact probe sensor strips (146).

There is also secured within an open top (126) of the main body (120) of this second embodiment a system for filtering gases from the wastewater treatment system that enter the main body through the openings (128) in the lower portion (127) of the main body. See FIG. 14. In one embodiment, as the gases flow upward within the integrated gas vent and high water alarm system (100), they encounter a gas filter (160), which filters the gases present in the wastewater treatment system. The structure and composition of this gas filter can be modified, as desired. In one embodiment the filter is a carbon filter. The filter is held in place by conventional structures, such as by ribs (154) present on the inside surface of the cover (150), as shown in FIG. 7B.

These high water alarm systems can be used in any wastewater treatment system or water containing system that includes a basin (16, 116) or tank. They are easily installed in an opening in the top of the basin and can be readily removed for cleaning or servicing.

In one embodiment both the high water alarm system (10) of the first embodiment and the gas vent and high water alarm system (100) of the second embodiment are insertable within an opening in a top of a basin (16, 116) of a water containing or wastewater treatment system. (See FIGS. 15A, 15B, 16A and 16B.) These systems can be secured within the opening in the top of the basin of the water containing or wastewater treatment system by any convenient connection system, such as a compression fit connection system, a threaded connection, a bayonet-type connection, a tapered pressure fit connection, or a snap-in connection. In one embodiment the main body of these high water alarm systems is tapered or partially tapered as part of the system for securing them within the tank. By use of one of these connection systems, the high water alarm system can be easily installed and removed for servicing. No additional access is needed to the water or wastewater treatment system for installation and servicing. Each of these systems are self-contained, modularized systems easy to install and service.

Figure 15A:
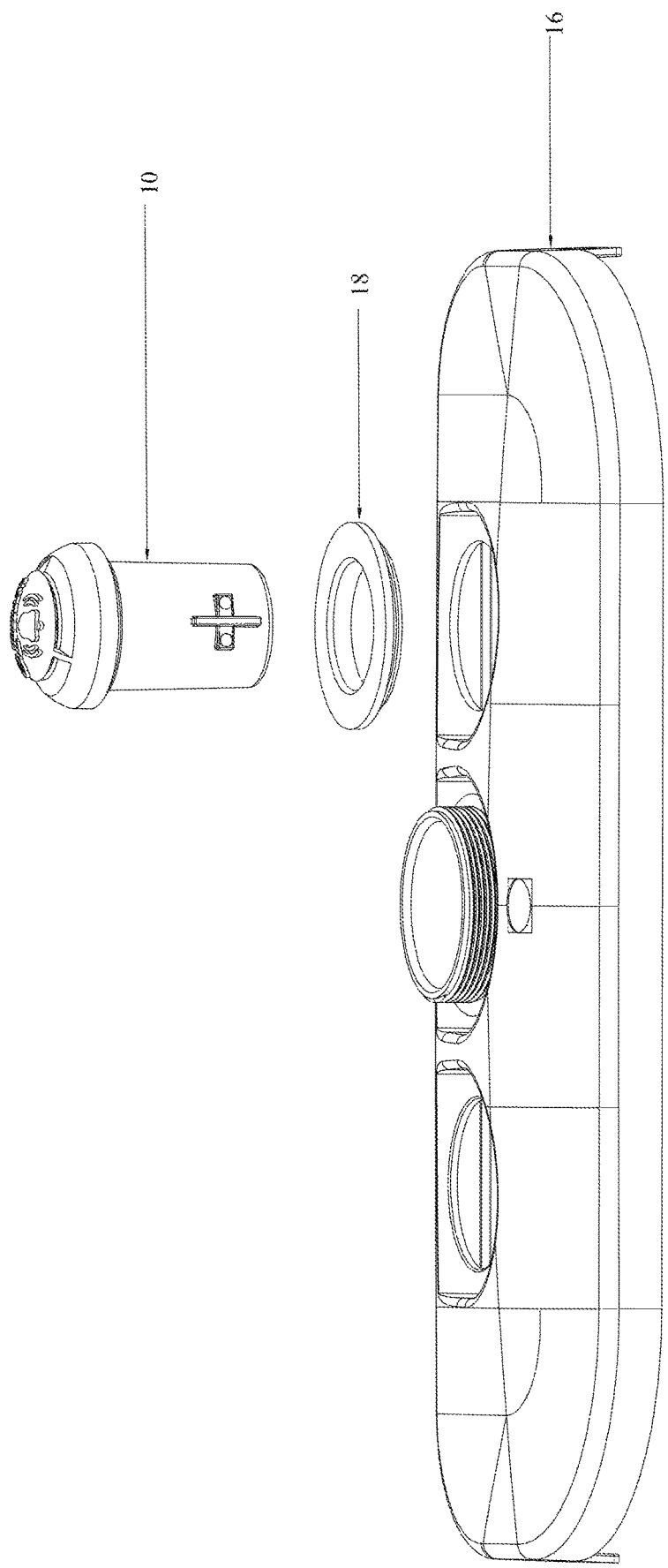
FIG. 15A is a perspective, partially exploded view of the high water alarm system of FIG. 1A prior to installation into an opening in a basin of a water or wastewater treatment system.
Figure 15B:
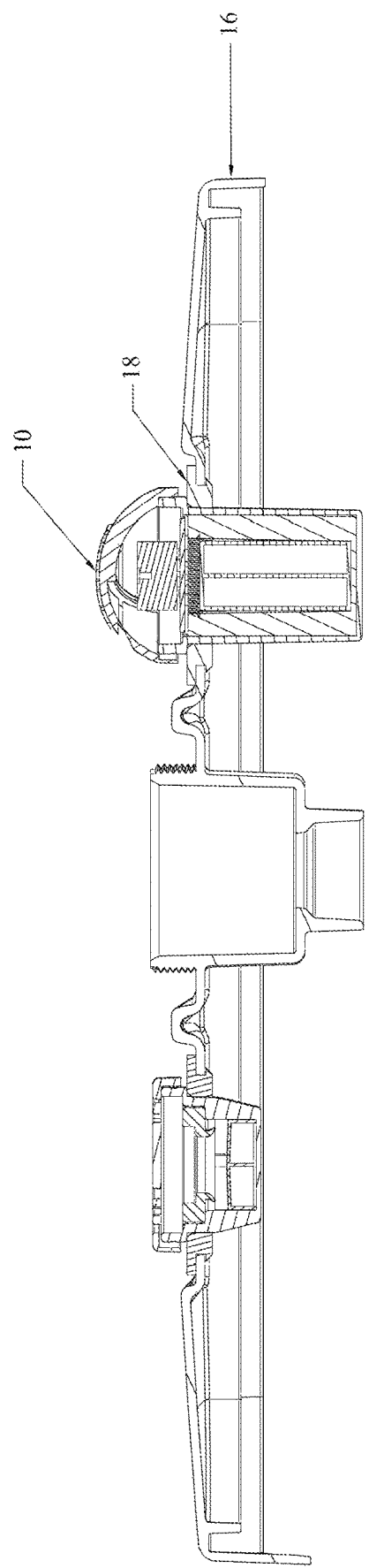
FIG. 15B is a side cutaway view of the high water alarm system of FIG. 1 installed into an opening in the basin lid of the water or wastewater system of FIG. 15A.

In one embodiment, as shown in FIGS. 15A and 15B, the high water alarm system (10) is secured within an opening in a top of a basin (16) of the water containing or wastewater treatment system by inserting the high water alarm system through a pipe seal (18), which is secured within the opening in the basin lid, as shown in FIG. 15B. By this connection the high water alarm system is secured within the water containing or wastewater treatment system.

Figure 16A:
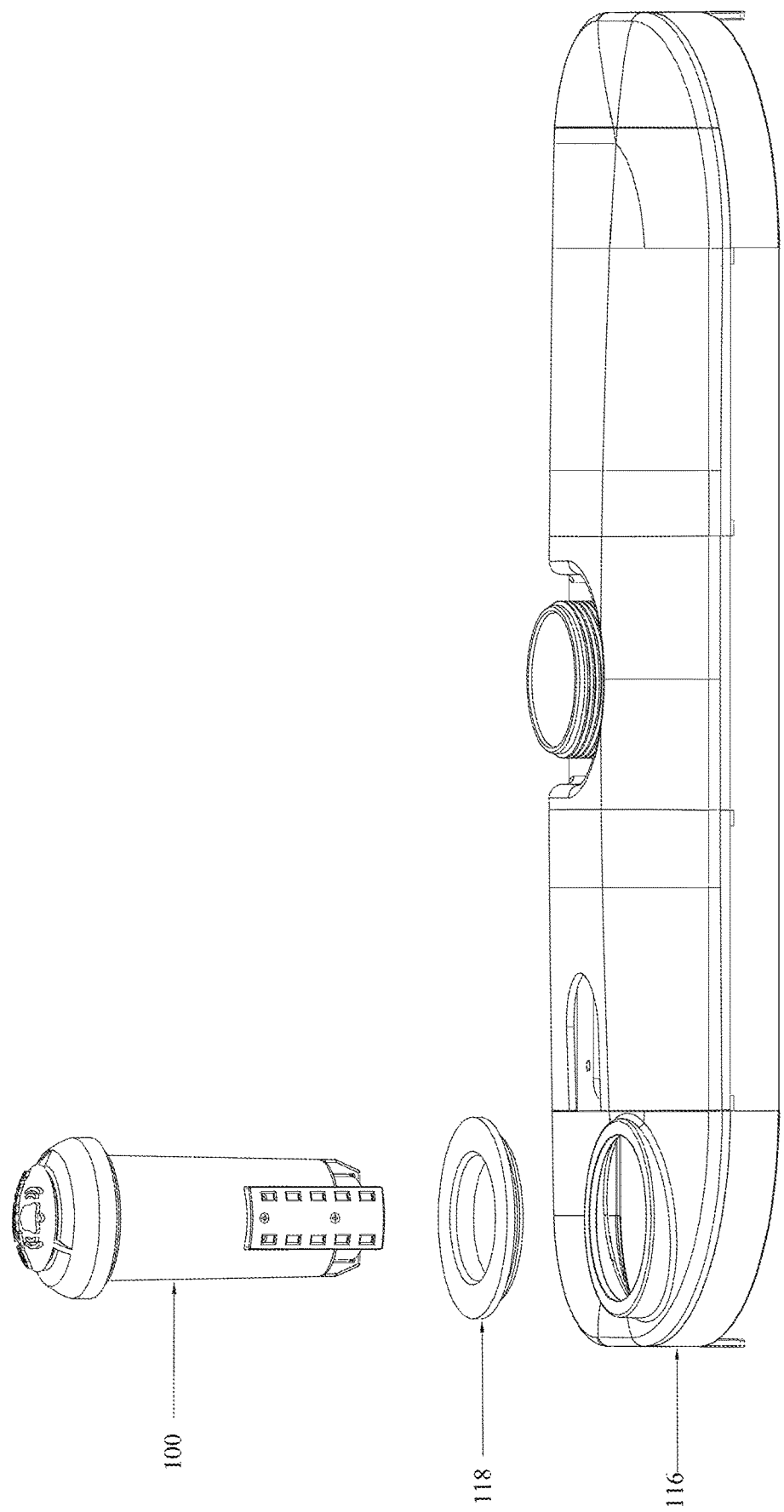
FIG. 16A is a perspective, partially exploded view of the gas vent and high water alarm system of FIG. 2B prior to installation into an opening in a basin of a water or wastewater treatment system.
Figure 16B:
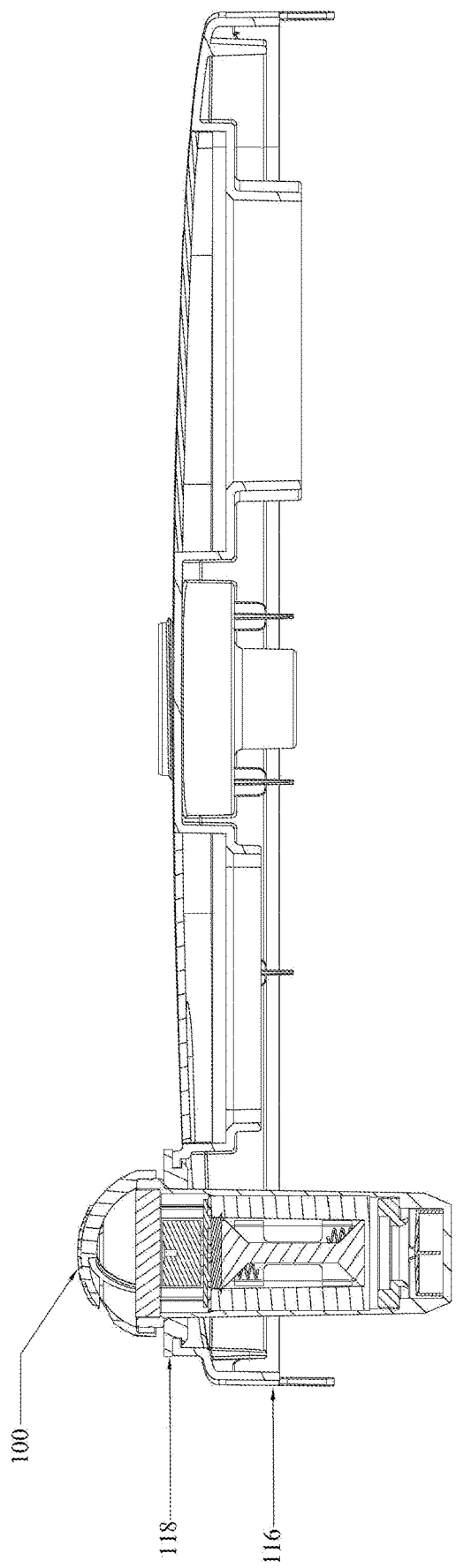
FIG. 16B is a cutaway side exploded view of the gas vent and high water alarm system of FIG. 2B installed into an opening in a basin of the wastewater treatment system of FIG. 2B.

In a further embodiment, as shown in FIGS. 16A and 16B, the gas vent and high water alarm system (100) is secured within an opening in a top of a basin (116) of the water containing or wastewater treatment system by inserting the gas vent and alarm system through a pipe seal (118) which is secured within the opening in the top of the basin, as shown in FIG. 16B. This connection also secures the gas vent and high water alarm system in place.

The foregoing detailed description is provided for understanding and does not provide any limitation on the scope of the claims. Modification to the invention will be obvious to those skilled in the art upon a review of the disclosure without departing from the scope of the impended claims.

LIST OF ELEMENTS 10 high water alarm system
16 basin
18 pipe seal
20 main body
22 cylindrical outer wall
23 inner wall
24 bottom
26 open top
36 slots
40 high water sensor
41 support
42 contact probes
43 baffle
44 wire terminals
45 extended baffle
50 Cover
52 air vent slots
54 downward sloping slots
70 battery holder sleeve
71 batter container
72 outer wall
73 inner wall
74 closed bottom
75 open top
76 spring strips
78,79 pins
80 alarm
82 gasket
90 circuit board
92 electrical contact clips
100 integrated gas vent and high water alarm system
116 basin
118 pipe seal
120 main body
122 cylindrical outer wall
123 inner wall
126 open top
127 lower portion
128 openings
130 vent valve ring seal
132 float
140 high water sensor
141 support
142 contact probes
143 baffle
144 probe cover
145 extended baffle
146 contact probe sensor strips
150 cover
154 ribs
160 gas filter
170 battery holder sleeve
171 battery container
180 alarm
182 gasket
190 circuit board

The invention claimed is:

1. A high water alarm system for a water containing or wastewater treatment system comprising
a main body comprising a wall with w outer and inner surfaces, a bottom, and an open top,
a battery container secured within the main body,
a high water sensor secured to the wall of the main body, which sensor is electrically connected to an alarm located within the main body, and
one or more electrical spring strips secured to the battery container,
wherein the electrical spring strips contact the high water sensor.

2. The high water alarm system of claim 1, wherein the high water sensor comprises one or more contact probes which extend through the wall of the main body, wherein the probes electrically activate the alarm upon contact with a liquid.

3. The high water alarm system of claim 1, further comprising a liquid level probe connected to the main body by wire terminals,
wherein the liquid level probe senses a level of water or wastewater in the system.

4. The high water alarm system of claim 1 wherein the main body further comprises slots in the inner surface of the wall,
wherein the battery container includes pins extending outward from an outer wall of the battery container, and
wherein the slots in the main body receive the pins from the battery container when the battery container is installed in the main body.

5. The high water alarm system of claim 4, wherein three slots are provided in the inner surface of separate walls of the wall of the main body, and
wherein three pins of the battery container extend from the outer wall into the slots when the battery container is installed in the main body.

6. The water alarm system of claim 1 further comprising a connection system for securing the high water alarm system into a top of the wastewater treatment system, wherein the connection system is selected from the group consisting of a threaded connection, a bayonet-type connection, a tapered pressure fit connection and a snap-in connection and combinations thereof.

7. The gas vent and high water alarm system of claim 1, further comprising a circuit board with electrical contact clips which contact the electrical spring strips.

8. A high water alarm system for a water containing or wastewater treatment system comprising
a main body comprising a wall with outer and inner surfaces, a bottom, and an open top,
a battery container secured within the main body,
a high water sensor secured to the wall of the main body, which sensor is electrically connected to an alarm located within the main body, and
a cover secured over the open top of the main body,
wherein the cover includes one or more air vent slots which extend through the cover.

9. The high water alarm system of claim 8, wherein one or more of the air vent slots slope downwardly to the outside of the cover.

10. A gas vent and high water alarm system for a water containing or wastewater treatment system comprising
a main body comprising a wall with outer and inner surfaces, an open top and a bottom, wherein the bottom includes one or more openings,
a battery container secured within the main body,
a gas filter secured within the main body,
a high water sensor secured to the wall of main body, which sensor is electrically connected to an alarm located within the system,
a sealing element to prevent wastewater from interacting with components of the system above the one or more openings in the bottom of the main body, and
one or more electrical spring strips secured to the battery container, wherein the electrical spring strips contact the high water sensor.

11. The gas vent and high water alarm system of claim 10, wherein the sealing element comprises a vent valve ring seal with float located within the main body.

12. The gas vent and high water alarm system of claim 10, wherein the high water sensor comprises one or more contact probes, which extend through the wall of the main body, wherein the probes electrically activate the alarm upon contact with a liquid.

13. The gas vent and high water alarm system of claim 10, further comprising one or more contact probe sensor strips secured to the high water sensor, which strips extend downward toward the bottom of the main body.

14. The gas vent and high water alarm system of claim 10, wherein the main body further comprises a series of slots in the inner surface of the wall of the main body,
wherein the battery container includes pins extending outward from an outer wall of the battery container, and
wherein the slots in the main body receive the pins from the battery container when the battery container is installed.

15. The gas vent and high water alarm system of claim 14, wherein three slots are provided in separate walls of the inner wall of the main body, and
wherein three pins of the battery container extend from the outer wall into these slots when the battery container is installed in the main body.

16. The gas vent and high water alarm system of claim 10 further comprising a circuit board with electrical contact clips which contact the electrical spring strips.

17. The gas vent and high water alarm system of claim 10, further comprising a cover secured over the open top of the main body, wherein the cover includes one or more air vents which extend through the cover.

18. The gas vent and high water alarm system of claim 17, wherein one or more of the air vent slots slope downwardly to the outside of the cover.

19. The gas vent and high water alarm system of claim 10, further comprising a connection system for securing the gas vent and high water alarm system into a top of the wastewater treatment system, wherein the connection system is selected from the group consisting of a compression fit connection system, a threaded connection, a bayonet-type connection, a tapered pressure fit connection, a snap-in connection, and combinations thereof.

20. The high water alarm system of claim 10, further comprising a liquid level probe connected to the main body by wire terminals,
wherein the liquid level probe senses a level of water or wastewater in the system.

* * * * *